United States Patent
Eguchi et al.

(10) Patent No.: US 12,164,080 B2
(45) Date of Patent: Dec. 10, 2024

(54) OPTICAL LAYERED BODY HAVING SPECIFIED AVERAGE ROUGHNESS AND SURFACE HARDNESS

(71) Applicant: DAI NIPPON PRINTING CO., LTD., Tokyo (JP)

(72) Inventors: Junya Eguchi, Tokyo (JP); Masatoshi Nishimura, Tokyo (JP); Yousuke Kousaka, Tokyo (JP); Nobuyuki Tobe, Tokyo (JP); Masahiro Torimoto, Tokyo (JP); Takayuki Fukuda, Tokyo (JP); Mitsuhiro Kuzuhara, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 829 days.

(21) Appl. No.: 16/961,603

(22) PCT Filed: Jan. 11, 2019

(86) PCT No.: PCT/JP2019/000793
§ 371 (c)(1),
(2) Date: Jul. 10, 2020

(87) PCT Pub. No.: WO2019/139150
PCT Pub. Date: Jul. 18, 2019

(65) Prior Publication Data
US 2021/0364673 A1    Nov. 25, 2021

(30) Foreign Application Priority Data

Jan. 12, 2018 (JP) .................. 2018-003481
Jan. 12, 2018 (JP) .................. 2018-003482

(51) Int. Cl.
*B32B 7/023*    (2019.01)
*G02B 1/11*    (2015.01)
(Continued)

(52) U.S. Cl.
CPC ............... *G02B 1/11* (2013.01); *B32B 7/023* (2019.01); *G02B 1/14* (2015.01); *G02B 5/30* (2013.01)

(58) Field of Classification Search
CPC ..... B32B 7/023; G02B 1/11–118; G02B 1/14; G02B 5/02–0294; G02B 5/30–3091;
(Continued)

(56) References Cited

U.S. PATENT DOCUMENTS

2008/0138606 A1 * 6/2008 Yoshihara ............... G02B 1/111
                                                          428/323
2010/0079868 A1    4/2010 Asakura et al.
(Continued)

FOREIGN PATENT DOCUMENTS

CN    101685168    3/2010
CN    107356489    11/2017
(Continued)

OTHER PUBLICATIONS

English translation of Yabuhara, JP 2014-126662 A, retrieved from Google Patents on Mar. 19, 2024 (Year: 2024).*

*Primary Examiner* — Ryan S Dunning
(74) *Attorney, Agent, or Firm* — HSML P.C.

(57) ABSTRACT

The present invention provides an optical layered body having excellent scratch resistance while having antireflective performance. The present invention relates to an optical layered body including a light-transmitting substrate; and at least an antiglare layer and a low refractive index layer disposed in the stated order on one surface of the light-transmitting substrate, wherein the low refractive index layer has an arithmetic average roughness Ra of projections and depressions of 4 nm or less and a ten-point average roughness Rz of the projections and depressions of 60 nm or less, where the Ra and the Rz are measured in any 5-μm square region of a surface of the low refractive index layer.

7 Claims, 2 Drawing Sheets

(51) Int. Cl.
*G02B 1/14* (2015.01)
*G02B 5/30* (2006.01)

(58) Field of Classification Search
CPC ........ G02F 1/133502; G02F 1/133504; H10K 59/50
See application file for complete search history.

(56) References Cited

U.S. PATENT DOCUMENTS

2015/0323705 A1\* 11/2015 Hart .................. G02B 1/14
359/601
2019/0310394 A1  10/2019 Miyamoto et al.

FOREIGN PATENT DOCUMENTS

| | | |
|---|---|---|
| JP | 2002-331615 | 11/2002 |
| JP | 2004-354828 | 12/2004 |
| JP | 2005-313593 | 11/2005 |
| JP | 2014-126662 | 7/2014 |
| JP | 2015-004979 | 1/2015 |
| JP | 2017-016153 | 1/2017 |
| JP | 2017-519232 | 7/2017 |
| JP | 2017-227898 | 12/2017 |
| TW | 2006-04006 | 2/2006 |
| WO | 2016/018490 | 2/2016 |

\* cited by examiner (a)

(b)

OPTICAL LAYERED BODY HAVING SPECIFIED AVERAGE ROUGHNESS AND SURFACE HARDNESS

TECHNICAL FIELD

The present invention relates to optical layered bodies, polarizing plates, display panels, and image display devices.

BACKGROUND ART

Image display devices such as liquid crystal displays (LCDs), cathode ray tube (CRT) displays, plasma displays (PDPs), electroluminescence displays (ELDs), and field emission displays (FEDs) typically have, on their image display surface, an antiglare film having projections and depressions on the surface or an antireflective optical layered body including an antireflective layer so as to reduce the reflection of an viewer or the viewer's background and the like.

These antireflective optical layered bodies reduce the reflection of images or lower the reflectance by diffusing or interfering light.

A known antireflective optical layered body includes a transparent substrate, an antiglare layer having projections and depressions and formed on a surface of the substrate, and a low refractive index layer having a low refractive index and formed on the antiglare layer.

Such optical layered bodies are wrapped in packing materials when transported or conveyed. Since mainly the projections among the projections and depressions of the antiglare layer form projections on the surface of the low refractive index layer, the contact between the optical layered bodies and packing materials have been considered point contact and thus less likely to damage the surface of the low refractive index layer.

In actual, however, the rubbing between the optical layered body and the packing material causes scratches in the surface of the low refractive index layer.

There is thus an increasing demand for improvement of the scratch resistance of optical layered bodies.

For conventional optical layered bodies, for example, Patent Literature 1 discloses a method of improving the scratch resistance of an optical layered body. In the method, for example, hardness is imparted to the antiglare layer by using a compound containing a polymerizable unsaturated group, or hardness is imparted to the low refractive index layer by adding inorganic fine particles thereto.

However, conventional optical layered bodies are hardly sufficient in scratch resistance, and there has been a demand for an optical layered body having further improved scratch resistance.

CITATION LIST

Patent Literature

Patent Literature 1: JP 2015-004979 A

SUMMARY OF INVENTION

Technical Problem

In view of the situation in the art, the present invention aims to provide an optical layered body having excellent scratch resistance while having antireflective performance.

Solution to Problem

The present invention relates to an optical layered body including: a light-transmitting substrate; and an antiglare layer and a low refractive index layer disposed in the stated order on one surface of the light-transmitting substrate, wherein the low refractive index layer has an arithmetic average roughness Ra of projections and depressions of 4 nm or less and a ten-point average roughness Rz of the projections and depressions of 60 nm or less, where the Ra and the Rz are measured in any 5-μm square region of a surface of the low refractive index layer (hereinafter also referred to as a first aspect of the present invention).

The present invention also relates to an optical layered body including: a light-transmitting substrate; and an antiglare layer and a low refractive index layer disposed in the stated order on one surface of the light-transmitting substrate, wherein the low refractive index layer has an arithmetic average roughness Ra of projections and depressions of 1.5 nm or less and a ten-point average roughness Rz of the projections and depressions of 30 nm or less, where the Ra and the Rz are measured in any 5-μm square region of a surface of the low refractive index layer, and a hardness measured by a nanoindentation method at an indenter penetration of 300 nm is higher than a hardness measured by the nanoindentation method at an indenter penetration of 30 nm (hereinafter also referred to as a second aspect of the present invention).

In the following description, the optical layered body of the first aspect of the present invention and the optical layered body of the second aspect of the present invention may be collectively referred to as "the optical layered body of the present invention" when no distinction is made therebetween.

In the optical layered body of the first aspect of the present invention, the surface of the low refractive index layer preferably has a hardness of 440 MPa or more as measured by a nanoindentation method at a penetration depth of 30 nm.

In the optical layered body of the present invention, the low refractive index layer preferably contains hollow silica fine particles.

The present invention also relates to a polarizing plate including: a polarizing element; and the optical layered body of the present invention on a surface of the polarizing element.

The present invention also relates to a display panel including the optical layered body of the present invention or the polarizing plate of the present invention.

The present invention also relates to an image display device including the optical layered body of the present invention or the polarizing plate of the present invention.

The present invention is described in detail below.

The present inventors made intensive studies on the method of imparting scratch resistance to an optical layered body including an antiglare layer and a low refractive index layer on one surface of a light-transmitting substrate. As a result, the inventors found out that the scratch resistance of the optical layered body can be improved by a method of imparting hardness to the low refractive index layer positioned at the surface, a method of imparting flatness to the low refractive index layer, a method of imparting slipperiness to the surface of the low refractive index layer, and a method of imparting interlayer adhesiveness between the low refractive index layer and the antiglare layer.

The present inventors also closely observed scratches formed on the surface of a conventional optical layered body including an antiglare layer and a low refractive index layer, and found out that the scratches are formed independently of the projections and depressions. Specifically, the inventors found out that there are two modes of scratches. In one mode, part of the low refractive index layer is scraped off, and the resulting reduction in thickness causes a change in interference color generated by interference of reflected light from the layers of the optical layered body including the low refractive index layer. In the other mode, the entire low refractive index layer is scraped and scratched. This revealed that the contact of the projections and depressions on the surface of the low refractive index layer, which has the antiglare layer beneath it, with another surface is not point contact, and unexpectedly the entire surface of the low refractive index layer receives contact.

The issue of the scratch resistance of an optical layered body including an antiglare layer and a low refractive index layer is significant in an optical layered body that must have both high transparency and excellent antiglare properties, especially an optical layered body for large displays required to provide clear images. The inventors further made a detailed study on the mechanism by which above issue occurs. The low refractive index layer has highly microscopic surface irregularities (irregularities of various shapes on the surface) affected by fine particles and the like in the low refractive index layer. The inventors assumed that when the surface of the low refractive index layer contacts a packing material or the like, the irregularities serve as the starting points of the scraping of the low refractive index layer or the separation of the entire layer upon application of an external force to the low refractive index layer due to the rubbing against the surface of the packing material or any other article.

As a result of the study, to improve the scratch resistance of the optical layered body including an antiglare layer and a low refractive index layer, the inventors considered that the low refractive index layer that makes surface contact as mentioned above is less likely to be scratched when it has no starting point of separation on the surface, in other words, when it has a flatter surface with finer irregularities. The inventors found out that to control the state of the irregularities, i.e., flatness, of the surface of the low refractive index layer having projections and depressions, it is necessary to study the flatness in a microscopic field of view that is less affected by the projections and depressions of the surface of the low refractive index layer, particularly the projections.

The inventors thus focused on the surface of the low refractive index layer in a microscopic field of view, and found out that making the surface very flat can impart excellent scratch resistance. The inventors thus completed the present invention.

The optical layered body of the present invention includes at least an antiglare layer and a low refractive index layer stacked in the stated order on one surface of a light-transmitting substrate.

The low refractive index layer means a layer having a lower refractive index than the components of the optical layered body of the present invention other than the low refractive index layer, such as the light-transmitting substrate and the antiglare layer.

The arithmetic average roughness Ra and ten-point average roughness Rz of the projections and depressions on the surface of the low refractive index layer and the hardness measured by a nanoindentation method described later are measured for an optical layered body including at least an antiglare layer and a low refractive index layer stacked in the stated order on one surface of a light-transmitting substrate.

The layer structure of the optical layered body can be suitably observed in a cross section using a STEM at 1000 to 20000 times magnification.

A lower height of the projections and depressions on the surface of the low refractive index layer indicates a flatter surface of the low refractive index layer. The arithmetic average roughness Ra and the ten-point average roughness Rz of the projections and depressions are indices of the height of the projections and depressions on the surface of the low refractive index layer.

The present invention uses the Ra and Rz to determine the irregularities and flatness of the surface of the low refractive index layer. The Ra is not a parameter that reveals an actual shape, but it shows the average height of the irregularities of various shapes as a whole on the target surface of the low refractive index layer, enabling control of the height of the irregularities as a whole.

The Rz is the average of the highest and lowest points in the irregularities of the surface of the low refractive index layer. The Ra alone is merely an average of the irregularities of the surface of the low refractive index layer, and may not show the presence of any sudden high projections or low depressions. Such projections and depressions may cause scratches, and thus the Ra alone is insufficient for controlling the irregularities of the surface of the low refractive index layer. Therefore, in the present invention, the Rz is used in addition to the Ra to control the maximum allowable height and the maximum allowable depth, enabling control of the above sudden projections or depressions.

In the optical layered body of the first aspect of the present invention, the low refractive index layer is very flat. Specifically, the low refractive index layer has an arithmetic average roughness Ra of the projections and depressions of 4 nm or less and a ten-point average roughness Rz of the projections and depressions of 60 nm or less, where the Ra and the Rz are in conformity with JIS B0601 (2001) and measured in any 5-μm square region of a surface of the low refractive index layer. In the optical layered body of the first aspect of the present invention, the low refractive index layer having a Ra of more than 4 nm or a Rz of more than 60 nm causes the optical layered body of the present invention to have insufficient flatness, leading to insufficient scratch resistance.

The optical layered body of the first aspect of the present invention has a structure in which at least the antiglare layer and the low refractive index layer are formed in the stated order on the light-transmitting substrate. The low refractive index layer thus has antiglare layer-derived projections and depressions on a surface, ensuring antiglare properties. Still, the surface of the low refractive index layer in a microscopic field of view (5-μm square region) is very flat. This allows the optical layered body of the first aspect of the present invention to have excellent scratch resistance.

The arithmetic average roughness (Ra) of the surface of the low refractive index layer in a microscopic field of view is more preferably 3 nm or less, still more preferably 2 nm or less.

The ten-point average roughness (Rz) of the surface of the low refractive index layer in a microscopic field of view is more preferably 45 nm or less, still more preferably 35 nm or less.

The excellent scratch resistance means that no scratch is formed in a scratch resistance test in which, for example, BON STAR steel wool (#0000) available from Bonstar Sales Co., Ltd. is rubbed to and fro on the surface of the low refractive index layer 10 times at a frictional load of 700 g/cm².

The projections and depressions on the surface of the low refractive index layer, particularly the flatness in a specific region of the surface other than the projections, may be controlled by a method of suitably forming projections and depressions by appropriately selecting a solvent in the later-described composition for a low refractive index layer, appropriately selecting drying conditions and curing conditions for the coating film formed by applying the later-described composition for a low refractive index layer, or appropriately selecting a leveling agent to be contained in the later-described composition for an antiglare layer.

The arithmetic average roughness (Ra) and ten-point average roughness (Rz) of the surface of the low refractive index layer are measured and calculated using an AFM (SPM-9600, available from Shimadzu Corporation) under the conditions below.

The definitions of the surface roughness parameters obtained by the AFM are as specified in JIS B0031 (1994). The AFM can calculate the parameters as the surface averages in the scan range (area of the field of view) with software included with SPM-9600.

Cantilever: NCH-W (NanoWorld AG)
Scan range: 5 μm (area of the field of view 5 μm×5 μm)
Scan speed: 1 Hz The AFM measurement excludes portions where defects such as specific falling or projections and depressions are observed.

The scan range is set to 5 μm (area of the field of view 5 μm×5 μm) because in order to determine or control the state of irregularities and the flatness of the surface of the low refractive index layer stacked on the surface of the antiglare layer that already has some projections and depressions, the area of the field of view for measurement is needed to be minimized to reduce the impact of the projections and depressions of the antiglare layer. An area of the field of view greater than the above range may contain defects such as distortion of the measurement sample, projections and depressions of the antiglare layer, or environmental foreign matter, which may make the AMF measurement itself difficult. An area of the field of view smaller than the above range may cause inappropriate evaluation of the surface roughness of the low refractive index layer. The Ra and Rz analysis conditions are as follows. The device used for measurement is SPM-9600 (available from Shimadzu Corporation).

<Preparation of Measurement Sample>

The measurement sample is prepared by steps (1) to (4) below.

(1) Carbon tape is attached to a sample stage and the release paper is removed with tweezers.
(2) A sample is held at its end with tweezers, and cut with scissors to 8 mm×8 mm to prepare a sample smaller than the carbon tape.
(3) Air is blown to the front and back of the sample using a blower to remove foreign matter.
(4) With the front (measurement surface) of the sample facing up, the carbon tape is attached to the back of the sample, whereby a measurement sample is prepared.

<Arithmetic Average Roughness Ra>

The arithmetic average roughness Ra is determined as follows in conformity with JIS B0031 (1994): A portion stretching over a reference length (l) in the direction in which the average line extends is cut out from the roughness curve of the surface of the obtained measurement sample. The Ra is calculated by the equation below when the roughness curve is expressed by y=f(x) with the X axis extending in the same direction as the average line in the portion and the Y axis in the direction of the vertical magnification in the portion. The obtained value is expressed in micrometers (μm).

$$Ra = \frac{1}{l}\int_0^l |f(x)|dx \qquad \text{[Math. 1]}$$

<Ten-Point Average Roughness Rz>

The ten-point average roughness Rz is determined as follows in conformity with JIS B0031 (1994): A portion stretching over a reference length (l) in the direction in which the average line extends is cut out from the roughness curve of the surface of the obtained measurement sample. The levels (Yp) of the highest to fifth highest peaks and the levels (Yv) of the lowest to fifth lowest troughs in this portion are measured in the direction of the vertical magnification from the average line. The Rz is the sum of the average of the absolute values of the levels (Yp) and the average of the absolute values of the levels (Yv) calculated by the equation below. The obtained value is expressed in micrometers (μm).

$$Rz = \frac{|Yp_1 + Yp_2 + Yp_3 + Yp_4 + Yp_5| + |Yv_1 + Yv_2 + Yv_3 + Yv_4 + Yv_5|}{5} \qquad \text{[Math. 2]}$$

In the equation, $Yp_1$, $Yp_2$, $Yp_3$, $Yp_4$, and $Yp_5$ are the levels of the highest to fifth highest peaks in the cut out portion over the reference length (l).

$Yv_1$, $Yv_2$, $Yv_3$, $Yv_4$, and $Yv_5$ are the levels of the lowest to fifth lowest troughs in the cut out portion over the reference length (l).

In the optical layered body of the first aspect of the present invention, the surface of the low refractive index layer preferably has a hardness of 440 MPa or more as measured by a nanoindentation method at a penetration depth of 30 nm.

The low refractive index layer having a hardness within this range can suitably impart better scratch resistance to the optical layered body of the first aspect of the present invention.

The nanoindentation method can determine hardness and elastic modulus from directly measurable physical quantities including load, indenter displacement from a site of contact between an indenter and a sample surface, and time. Specifically, as shown in FIG. 1(a), a sample is indented with an indenter (acute-angle indenter), and the indentation load p and the penetration depth (indentation depth h) in unloading are continuously observed in-situ. This provides an indentation load-indentation depth curve as shown in FIG. 1(b), from which hardness and elastic modulus can be determined without direct observation. Here, since the base principle of this approach is drawn under the assumption of an elastic deformation region, the hardness is calculated under elastic deformation conditions.

It is difficult to avoid mixing of elastic deformation and plastic deformation in the indentation process. Thus, to isolate only the contribution of the elastic deformation, the surface when plastic deformation occurs is used as the starting point of the analysis. In other words, as shown in FIG. 1(b), the hardness is determined by focusing on the unloading curve that shows simple elastic recovery in the indentation load-indentation depth curve. Thus, the hardness obtained by the nanoindentation method mainly represents the elastic deformation characteristics of a cured resin layer made of a polymer material such as the present invention.

Improvement of scratch resistance, a purpose of the present invention, is presumably affected by a force that pushes back against a rubbing force immediately after the scratch-receiving surface layer itself receives the force. This mechanism exactly corresponds to the mechanism of the hardness obtained by the above nanoindentation method (force of elastic recovery after plastic deformation). The nanoindentation method is thus selected from various indentation hardness test methods, as the evaluation based on the hardness obtained by the nanoindentation method is considered most suitable for the present invention.

As described above, improving flatness to achieve good irregularities of the surface of the low refractive index layer is considered essential to improve scratch resistance. Good irregularities can provide a scratch resistance of a load of about 300 g/cm$^2$ to 500 g/cm$^2$. An optical layered body having such a scratch resistance is preferable for fixed TV monitor displays for home use. Meanwhile, recent displays are frequently used in digital signage in stations and airports, for example, and more and more likely to get contact and scraped with foreign matter such as dust, humans, bags, and other articles. In some cases, thus, higher scratch resistance, for example a load of 600 g/cm$^2$ or more, may be preferred. The inventors found out that in such cases, it is effective to improve the hardness related to the elastic deformation and elastic recovery of the low refractive index layer itself, which is a surface layer that receives rubbing forces, as well as improving the flatness.

The penetrating depth is set to 30 nm so as to determine the hardness to which the elastic deformation force of the low refractive index layer itself is related. In addition, this depth allows stable measurement and is hardly affected by an undercoat layer such as the antiglare layer.

The hardness of the surface of the low refractive index layer measured by the nanoindentation method at a penetration depth of 30 nm is more preferably 500 MPa or more, still more preferably 600 MPa or more. The upper limit of the hardness of the surface of the low refractive index layer measured by the nanoindentation method at a penetration depth of 30 nm is preferably 4000 MPa, more preferably 2000 MPa, still more preferably 1600 MPa. If the hardness is more than 4000 MPa, microcracks are easily formed due to, for example, a difference in hardness between the low refractive index layer and the antiglare layer as an undercoat layer. The microcracks may reduce the adhesiveness between the low refractive index layer and a layer such as the antiglare layer, leading to separation.

The hardness obtained by the nanoindentation method as used herein is measured using "TI950 TriboIndenter" available from HYSITRON in the displacement control mode.

Specifically, the low refractive index layer is indented to 30 nm with an indenter such as a Berkovich indenter (triangular pyramid, diamond-made, angle between edges) 115° as shown in FIG. 2 at a loading rate of 10 nm/s. After holding for a certain period of time to relax residual stress, the indenter is unloaded, whereby a load-displacement curve can be obtained. The indentation hardness is then automatically calculated by the device. Calculation is conducted as follows: From the unloading curve, the depth of contact of the sample with the indenter (contact depth) is calculated. From the contact depth is determined a contact projected area (A (nm$^2$)). Using this area and the maximum load (Pmax (μN)) after relaxation, the indentation hardness is automatically calculated according to Pmax/A. The automatic calculation uses the Oliver-Pharr analysis approach, for example.

To obtain stable measurement results, the sample surface was observed with a microscope at 50 to 500 times magnification. Portions having extremely projected or extremely depressed structures were avoided, and a portion as smooth as possible and free of specific defects was selected for the measurement. The penetration depth of the indenter is set to 30 nm to allow stable measurement of the hardness by the nanoindentation method. The hardness measurement by the nanoindentation method is performed in an environment at 25° C.±5° C. and a relative humidity of 30% or more but 70% or less.

The sample for the measurement by the nanoindentation method may be produced by the following method, for example.

The optical layered body is cut to 20 mm×20 mm and fixed to a commercially available glass slide via an adhesive resin (product name "Aron Alpha® General-purpose type", available from Toagosei Co., Ltd.) with the low refractive index layer side facing up. Specifically, the adhesive resin is deposited dropwise on the center of glass slide 1 (product name "Glass slide (untreated edges) 1-9645-11", available from As One Corporation). At this time, the adhesive resin is not spread out, and one droplet is deposited so that the adhesive resin does not spill out from the optical layered body when the adhesive resin is pressed as described later.

The cut optical layered body is then brought into contact with the glass slide such that the low refractive index layer side faces up and the adhesive resin is positioned at the center of the optical layered body. The adhesive resin is pressed between the glass slide 1 and the optical layered body, whereby the glass slide 1 and the optical layered body are temporarily bonded.

Another new glass slide 2 is then placed on the optical layered body to prepare a glass slide 1/adhesive resin/optical layered body/glass slide 2 layered body.

Subsequently, on the glass slide 2 is placed a weight of at least 30 g but not more than 50 g. The layered body is left to stand at this state for 12 hours at room temperature. The weight and glass slide 2 are then removed, whereby a measurement sample is obtained.

The optical layered body fixed with the adhesive resin may be further fixed at the four corners with tape (product name "Cellotape®", available from Nichiban Co., Ltd.).

The measurement of the hardness by the nanoindentation method (indentation hardness) using the above measurement sample may be specifically performed as follows, for example.

The measurement sample is fixed to a measurement stage of a measurement device placed in parallel with a vibration isolation table.

The measurement sample may be fixed by any method that immobilizes the measurement sample. For example, the four corners of the glass slide 1 are fixed with tape (product name "Cellotape®, available from Nichiban Co., Ltd.").

If the measurement device includes an air suction system, the measurement sample may be fixed with it.

After the measurement sample is fixed to the measurement stage, the indentation hardness of the surface of the low refractive index layer at a penetration of 30 nm is measured under the measurement conditions below.

The indentation hardness is the arithmetic average of hardnesses measured at randomly selected five points at or near the center (region in which the adhesive resin exists) of the surface of the low refractive index layer of the measurement sample.

The five measurement points are randomly selected by observing the low refractive index layer with a microscope at 50 to 500 times magnification. The points are selected from a portion as smooth as possible, avoiding extremely projected or extremely depressed structures.

The hardness at an indenter penetration of 30 nm is specifically preferably measured under the following conditions.

Indenter: Berkovich indenter (triangular pyramid)
Measurement conditions: displacement control mode
Displacement control mode maximum displacement: 30 nm
Time to reach maximum displacement: 3 seconds
Retention time at maximum displacement: 5 seconds
Unloading time from maximum displacement: 3 seconds
Test point number: five points (the arithmetic average thereof is taken as the measurement results)
Measurement temperature: 25° C.
Measurement relative humidity: 50%

In the optical layered body of the second aspect of the present invention, the low refractive index layer is very flat. Specifically, the low refractive index layer has an arithmetic average roughness Ra of the projections and depressions of 1.5 nm or less and a ten-point average roughness Rz of the projections and depressions of 30 nm or less, where the Ra and the Rz are in conformity with JIS B0601 (1992) and measured in any 5-μm square region of a surface of the low refractive index layer.

The optical layered body of the second aspect of the present invention has a structure in which at least the antiglare layer and the low refractive index layer are formed in the stated order on the light-transmitting substrate. The low refractive index layer thus has antiglare layer-derived projections and depressions on a surface, ensuring antiglare properties. Still, the surface of the low refractive index layer in a microscopic field of view (5-μm square region) is very flat.

The optical layered body of the second aspect of the present invention satisfies such arithmetic average roughness (Ra) range and ten-point average roughness (Rz) range. Further, the hardness of the low refractive index layer measured by a nanoindentation method satisfies a specific relation. Thus, the optical layered body can have preferable flatness and excellent scratch resistance.

In the optical layered body of the second aspect of the present invention, the arithmetic average roughness (Ra) of the surface of the low refractive index layer is preferably 1.2 nm or less, more preferably 1.0 nm or less.

In the optical layered body of the second aspect of the present invention, the ten-point average roughness (Rz) of the surface of the low refractive index layer is preferably 25 nm or less, more preferably 20 nm or less.

The excellent scratch resistance means that no scratch is formed in a scratch resistance test in which, for example, BON STAR steel wool (#0000) available from Bonstar Sales Co., Ltd. is rubbed to and fro on the surface of the low refractive index layer 10 times at a frictional load of 700 g/cm$^2$.

The projections and depressions on the surface of the low refractive index layer in the optical layered body of the second aspect of the present invention may be controlled by a method of suitably forming projections and depressions by appropriately selecting a solvent in the later-described composition for a low refractive index layer, appropriately selecting drying conditions and curing conditions for the coating film formed by applying the later-described composition for a low refractive index layer, or appropriately selecting a leveling agent to be contained in the later-described composition for an antiglare layer.

The arithmetic average roughness (Ra) and ten-point average roughness (Rz) of the surface of the low refractive index layer in the optical layered body of the second aspect of the present invention are measured and calculated using an AFM (SPM-9600 available from Shimadzu Corporation) under the conditions below.

The definitions of the surface roughness parameters obtained by the AFM are as specified in JIS B0031 (1994). The AFM can calculate the parameters as the surface averages in the scan range (area of the field of view) with software included with SPM-9600.

Cantilever: NCH-W (NanoWorld AG)
Scan range: 5 μm (area of the field of view 5 μm×5 μm)
Scan speed: 1 Hz The AFM measurement excludes portions where defects such as specific falling or projections and depressions are observed.

The scan range is set to 5 μm (area of the field of view 5 μm×5 μm) because in order to determine or control the state of irregularities and the flatness of the surface of the low refractive index layer stacked on the surface of the antiglare layer that already has some projections and depressions, the area of the field of view for measurement is needed to be minimized to reduce the impact of the projections and depressions of the antiglare layer. An area of the field of view greater than the above range may contain defects such as distortion of the measurement sample, projections and depressions of the antiglare layer, or environmental foreign matter, which may make the AMF measurement itself difficult. An area of the field of view smaller than the above range may cause inappropriate evaluation of the surface roughness of the low refractive index layer. The Ra and Rz analysis conditions are as follows. The device used for measurement is SPM-9600 (available from Shimadzu Corporation).

<Preparation of Measurement Sample>

The measurement sample is prepared by steps (1) to (4) below.

(1) Carbon tape is attached to a sample stage and the release paper is removed with tweezers.
(2) A sample is held at its end with tweezers, and cut with scissors to 8 mm×8 mm to prepare a sample smaller than the carbon tape.
(3) Air is blown to the front and back of the sample using a blower to remove foreign matter.
(4) With the front (measurement surface) of the sample facing up, the carbon tape is attached to the back of the sample, whereby a measurement sample is prepared.

<Arithmetic Average Roughness Ra>

The arithmetic average roughness Ra is determined as follows in conformity with JIS B0031 (1994): A portion stretching over a reference length (l) in the direction in which the average line extends is cut out from the roughness curve of the surface of the obtained measurement sample. The Ra is calculated by the equation below when the roughness curve is expressed by y=f(x) with the X axis extending in the same direction as the average line in the portion and the Y axis in the direction of the vertical magnification in the portion. The obtained value is expressed in micrometers (μm).

$$Ra = \frac{1}{\ell} \int_0^\ell |f(x)| dx \quad \text{[Math. 3]}$$

<Ten-Point Average Roughness Rz>

The ten-point average roughness Rz is determined as follows in conformity with JIS B0031 (1994): A portion stretching over a reference length (l) in the direction in which the average line extends is cut out from the roughness curve of the surface of the obtained measurement sample. The levels (Yp) of the highest to fifth highest peaks and the levels (Yv) of the lowest to fifth lowest troughs in this portion are measured in the direction of the vertical magnification from the average line. The Rz is the sum of the average of the absolute values of the levels (Yp) and the average of the absolute values of the levels (Yv) calculated by the equation below. The obtained value is expressed in micrometers (μm).

$$Rz = \frac{|Yp_1 + Yp_2 + Yp_3 + Yp_4 + Yp_5| + |Yv_1 + Yv_2 + Yv_3 + Yv_4 + Yv_5|}{5} \quad \text{[Math. 4]}$$

In the equation, $Yp_1$, $Yp_2$, $Yp_3$, $Yp_4$, and $Yp_5$ are the levels of the highest to fifth highest peaks in the cut out portion over the reference length (l).

$Yv_1$, $Yv_2$, $Yv_3$, $Yv_4$, and $Yv_5$ are the levels of the lowest to fifth lowest troughs in the cut out portion over the reference length (l).

In the low refractive index layer of the optical layered body of the second aspect of the present invention, a hardness measured by a nanoindentation method at an indenter penetration of 300 nm is higher than a hardness measured by the nanoindentation method at an indenter penetration of 30 nm.

The low refractive index layer having a hardness within this range can suitably impart scratch resistance to the optical layered body of the second aspect of the present invention.

The nanoindentation method can determine hardness and elastic modulus from directly measurable physical quantities including load, indenter displacement from a site of contact between an indenter and a sample surface, and time. Specifically, as shown in FIG. 1(a), a sample is indented with an indenter (acute-angle indenter), and the indentation load p and the penetration depth (indentation depth h) in unloading are continuously observed in-situ. This provides an indentation load-indentation depth curve as shown in FIG. 1(b), from which hardness and elastic modulus can be determined without direct observation. Here, since the base principle of this approach is drawn under the assumption of an elastic deformation region, the hardness is calculated under elastic deformation conditions.

It is difficult to avoid mixing of elastic deformation and plastic deformation in the indentation process. Thus, to isolate only the contribution of the elastic deformation, the surface when plastic deformation occurs is used as the starting point of the analysis. In other words, as shown in FIG. 1(b), the hardness is determined by focusing on the unloading curve that shows simple elastic recovery in the indentation load-indentation depth curve. Thus, the hardness obtained by the nanoindentation method mainly represents the elastic deformation characteristics of a cured resin layer made of a polymer material such as the present invention.

Improvement of scratch resistance, a purpose of the present invention, is presumably affected by a force that pushes back against a rubbing force immediately after the scratch-receiving surface layer itself receives the force. This mechanism exactly corresponds to the mechanism of the hardness obtained by the above nanoindentation method (force of elastic recovery after plastic deformation). The nanoindentation method is thus selected from various indentation hardness test methods, as the evaluation based on the hardness obtained by the nanoindentation method is considered most suitable for the present invention.

As described above, improving flatness to achieve good irregularities of the surface of the low refractive index layer is considered essential to improve scratch resistance. The low refractive index layer having very high flatness, good irregularities, and the hardness (nanoindentation hardness) balanced as described above can impart excellent scratch resistance of a load of 700 g/cm$^2$ or more.

The hardness at an indenter penetration of 30 nm is related to the physical properties (e.g., elastic deformation and elastic recovery) of only the low refractive index layer. On the other hand, the hardness at an indenter penetration of 300 nm, a depth 200 nm deeper than the about 100-nm-thick low refractive index layer, is related to the physical properties of both the low refractive index layer and the antiglare layer, for example, if the antiglare layer is the undercoat layer of the low refractive index.

The scratch resistance is normally strongly related to the low refractive index layer. However, at a high load, it is also strongly related to its undercoat layer such as the antiglare layer. The undercoat layer herein is not limited to a single layer directly beneath the low refractive index layer, and may be all of the multiple layers beneath the low refractive index layer.

The above combination of the flatness and the hardness (nanoindentation hardness) balance is effective for high scratch resistance for the following reason.

When the hardness related to the undercoat layer and low refractive index layer (e.g., the antiglare layer and low refractive index layer) is greater than the hardness of the low refractive index layer, the layered body is in a state that can exhibit elastic physical properties, including elastic recovery, that push back against a rubbing force. When such a layered body has very high surface flatness, it can push back against the rubbing force better while maintaining slipperiness. This presumably allows the layered body to maintain the original scratch-resistant state. In contrast, when the hardness of the low refractive index layer is greater than the hardness related to the undercoat layer and low refractive index layer, the layered body has a weaker force to push back against a rubbing force, and is less likely to achieve the above state. In addition, the low refractive index layer easily cracks due to the excessively high hardness, and thus may have weak adhesiveness to the undercoat layer.

In the optical layered body of the second aspect of the present invention, the lower limit of the hardness measured by the nanoindentation method at an indenter penetration of 300 nm is preferably 490 MPa and the upper limit thereof is preferably 580 MPa. The lower limit is more preferably 510 MPa and the upper limit is more preferably 560 MPa.

In the optical layered body of the second aspect of the present invention, the lower limit of the hardness measured by the nanoindentation method at an indenter penetration of 30 nm is preferably 470 MPa and the upper limit thereof is preferably 560 MPa. The lower limit is more preferably 490 MPa and the upper limit is more preferably 540 MPa.

The hardness obtained by the nanoindentation method as used herein is measured using "TI950 TriboIndenter" available from HYSITRON in the displacement control mode.

Specifically, the low refractive index layer is indented to 30 nm or 300 nm with an indenter such as a Berkovich indenter (triangular pyramid, diamond-made, angle between edges 115°) as shown in FIG. 2 at a loading rate of 10 nm/s. After holding for a certain period of time to relax residual stress, the indenter is unloaded, whereby a load-displacement curve can be obtained. The indentation hardness is then automatically calculated by the device. Calculation is conducted as follows: From the unloading curve, the depth of contact of the sample with the indenter (contact depth) is calculated. From the contact depth is determined a contact projected area (A ($nm^2$)). Using this area and the maximum load (Pmax (μN)) after relaxation, the indentation hardness is automatically calculated according to Pmax/A. The automatic calculation uses the Oliver-Pharr analysis approach, for example.

To obtain stable measurement results, the sample surface was observed with a microscope at 50 to 500 times magnification. Portions having extremely projected or extremely depressed structures were avoided, and a portion as smooth as possible and free of specific defects was selected for the measurement. The penetration depth of the indenter is set to 30 nm or 300 nm to allow stable measurement of the hardness by the nanoindentation method. The hardness measurement by the nanoindentation method is performed in an environment at 25° C.±5° C. and a relative humidity of 30% or more but 70% or less.

The sample for the measurement by the nanoindentation method may be produced by the following method, for example.

The optical layered body is cut to 20 mm×20 mm and fixed to a commercially available glass slide via an adhesive resin (product name "Aron Alpha® General-purpose type", available from Toagosei Co., Ltd.) with the low refractive index layer side facing up. Specifically, the adhesive resin is deposited dropwise on the center of glass slide 1 (product name "Glass slide (untreated edges) 1-9645-11", available from As One Corporation). At this time, the adhesive resin is not spread out, and one droplet is deposited so that the adhesive resin does not spill out from the optical layered body when the adhesive resin is pressed as described later.

The cut optical layered body is then brought into contact with the glass slide such that the low refractive index layer side faces up and the adhesive resin is positioned at the center of the optical layered body. The adhesive resin is pressed between the glass slide 1 and the optical layered body, whereby the glass slide 1 and the optical layered body are temporarily bonded.

Another new glass slide 2 is then placed on the optical layered body to prepare a glass slide 1/adhesive resin/optical layered body/glass slide 2 layered body.

Subsequently, on the glass slide 2 is placed a weight of at least 30 g but not more than 50 g. The layered body is left to stand at this state for 12 hours at room temperature. The weight and glass slide 2 are then removed, whereby a measurement sample is obtained.

The optical layered body fixed with the adhesive resin may be further fixed at the four corners with tape (product name "Cellotape®", available from Nichiban Co., Ltd.).

The measurement of the hardness by the nanoindentation method (indentation hardness) using the above measurement sample may be specifically performed as follows, for example.

The measurement sample is fixed to a measurement stage of a measurement device placed in parallel with a vibration isolation table.

The measurement sample may be fixed by any method that immobilizes the measurement sample. For example, the four corners of the glass slide 1 are fixed with tape (product name "Cellotape®, available from Nichiban Co., Ltd.").

If the measurement device includes an air suction system, the measurement sample may be fixed with it.

After the measurement sample is fixed to the measurement stage, the indentation hardness of the surface of the low refractive index layer at a penetration of 30 nm or 300 nm is measured under the measurement conditions below.

The indentation hardness is the arithmetic average of hardnesses measured at randomly selected five points at or near the center (region in which the adhesive resin exists) of the surface of the low refractive index layer of the measurement sample.

The five measurement points are randomly selected by observing the low refractive index layer with a microscope at 50 to 500 times magnification. The points are selected from a portion as smooth as possible, avoiding extremely projected or extremely depressed structures.

The hardness at an indenter penetration of 30 nm is specifically preferably measured under the following conditions.

Indenter: Berkovich indenter (triangular pyramid, diamond-made, angle between edges 115°)
Measurement conditions: displacement control mode
Displacement control mode maximum displacement: 30 nm
Time to reach maximum displacement: 3 seconds
Retention time at maximum displacement: 5 seconds
Unloading time from maximum displacement: 3 seconds
Test point number: five points (the arithmetic average thereof is taken as the measurement results)
Measurement temperature: 25° C.
Measurement relative humidity: 50%

The hardness at an indenter penetration of 300 nm is specifically preferably measured under the following conditions.

Indenter: Berkovich indenter (triangular pyramid)
Measurement conditions: displacement control mode
Displacement control mode maximum displacement: 300 nm
Time to reach maximum displacement: 30 seconds
Retention time at maximum displacement: 5 seconds
Unloading time at maximum displacement: 30 seconds
Test point number: five points (the arithmetic average thereof is taken as the measurement results)
Measurement temperature: 25° C.
Measurement relative humidity: 50%

In the optical layered body of the second aspect of the present invention, the surface of the low refractive index layer preferably has a water contact angle of 102° or less. The surface of the low refractive index layer having a water contact angle of 102° or less can impart sufficient interlayer adhesiveness between the low refractive index layer and another layer, improving scratch resistance.

The water contact angle of the surface of the low refractive index layer is more preferably 100° or less.

The low refractive index layer preferably contains hollow silica fine particles.

The hollow silica fine particles function to maintain the layer strength of the low refractive index layer while reducing the refractive index thereof. The "hollow silica fine particles" as used herein are structures the inside of which is filled with gas, and means silica fine particles that show a decrease in refractive index in inverse proportion to the gas content compared with the original refractive index of silica fine particles.

Specific examples of the hollow silica fine particles are not limited. Preferred examples thereof include silica fine particles prepared by the technique disclosed in JP 2001-233611 A. Hollow silica fine particles are easy to produce and have high hardness by themselves. When mixed with the later-described binder component and the like to form the low refractive index layer, the hollow silica fine particles enable adjustment to improve the layer strength and reduce the refractive index.

In the optical layered body of the present invention, the hollow silica fine particles have an average particle size of 45 to 65 nm. Hollow silica fine particles having an average particle size of less than 45 nm fail to sufficiently reduce the refractive index of the low refractive index layer. Hollow silica fine particles having an average particle size of more than 65 nm increase protrusion of the particles from the surface of the low refractive index layer, preventing the low refractive index layer from having the very high flatness described above. The lower limit of the average particle size of the hollow silica fine particles is preferably 47 nm and the upper limit thereof is preferably 60 nm. The hollow silica fine particles having an average particle size within this range allow the low refractive index layer to maintain flatness and provide good appearance.

The average particle size of the hollow silica fine particles means the average particle size of the hollow silica fine particles in the low refractive index layer, and is a value determined as follows: A cross section of the low refractive index layer in the thickness direction is observed with, for example, a SEM, TEM, or STEM. Any 30 single hollow silica fine particles are selected and the particle size thereof in the cross section is measured. The average of the obtained particle sizes is calculated as the average particle size.

For example, 20 images are captured at a magnification of 10000 to 200000 times at any points in a cross section of the low refractive index layer in the thickness direction using a scanning transmission electron microscope (STEM) (product name "S-4800 (TYPE 2)", available from Hitachi High-Technologies Corporation) set as follows: signal selection: "TE", accelerating voltage: "30 kV", emission current: "10 µA", probe current: "Norm", focus mode: "UHR", condenser lens 1: "5.0", W. D.: "8 mm", and tilt: "0°". On the captured images, the maximum sizes of 30 hollow silica fine particles is actually measured using software included with the STEM. The arithmetic average of the obtained sizes is determined as the particle average size.

In the optical layered body of the present invention, the average particle size of the hollow silica fine particles is preferably 50% or more but less than 100% of the thickness of the low refractive index layer. Hollow silica fine particles having an average size of less than 50% of the thickness fail to sufficiently reduce the refractive index of the low refractive index layer, and thus may cause the optical layered body of the present invention to have poor antireflective performance. Hollow silica fine particles having an average size of 100% or more of the thickness cause the formation of hollow silica fine particle-derived fine projections and depressions on the low refractive index layer, leading to insufficient control of the irregularities. As a result, the low refractive index layer may fail to have sufficient flatness in a specific region, and also the optical layered body of the present invention may have poor haze. The lower limit of the average particle size of the hollow silica fine particles is preferably 70% of the thickness of the low refractive index layer and the upper limit thereof is preferably 80%. The hollow silica fine particles having an average particle size within this range allows the effects of the present invention to be more suitably exerted.

The hollow silica fine particles preferably have a shell thickness of 5 to 12 nm. Hollow silica fine particles having a shell thickness of less than 5 nm may have insufficient strength. Hollow silica fine particles having a shell thickness of more than 12 nm may not sufficiently reduce the refractive index of the low refractive index layer. The lower limit of the shell thickness is more preferably 6 nm and the upper limit thereof is more preferably 10 nm. The shell means a shell constituted by the silica excluding the gas located in the center of the hollow silica fine particle. The shell thickness can be measured by microscopy of a cross section of the low refractive index layer.

The amount of the hollow silica fine particles in the low refractive index layer is appropriately adjusted according to the later-described state of the hollow silica fine particles contained in the low refractive index layer, and is preferably 50 to 200 parts by mass relative to 100 parts by mass of the later-described binder resin (solid content). The hollow silica fine particles in an amount of less than 50 parts by mass are too little to sufficiently reduce the refractive index of the low refractive index layer, possibly leading to insufficient antireflective performance of the optical layered body of the present invention. The hollow silica fine particles in an amount of more than 200 parts by mass may not show the effect commensurate with the added amount, and also may lead to insufficient strength of the low refractive index layer. The lower limit of the amount of the hollow silica fine particle is preferably 60 parts by mass and the upper limit thereof is more preferably 180 parts by mass.

The low refractive index layer preferably contains solid silica fine particles.

The "solid silica fine particles" as used herein are structures the inside of which is not filled with gas, unlike the hollow silica fine particles, and means silica fine particles having the original refractive index of silica fine particles. The solid silica fine particles may be any solid silica fine particles such as amorphous wet silica synthesized in liquid or dry silica produced mainly by combustion of silicone tetrachloride.

The solid silica fine particles preferably have an average particle size of 8 to 50 nm. Solid silica fine particles having an average particle size of less than 8 nm may not increase the hardness of the surface of the low refractive index layer. Solid silica fine particles having an average particle size of more than 50 nm may increase the arithmetic average roughness Ra and Rz measured in any 5-µm square region of the surface of the low refractive index layer.

The lower limit of the average particle size of the solid silica fine particles is more preferably 10 nm and the upper limit thereof is more preferably 20 nm.

The average particle size of the solid silica fine particles means a value measured in the same manner as for the hollow silica fine particles.

The amount of the solid silica fine particle in the low refractive index layer is preferably 10 to 100 parts by mass relative to 100 parts by mass of the solid content of the later-described binder resin.

The solid silica fine particles in the low refractive index layer in an amount of less than 10 parts by mass may have an insufficient hardness-increasing effect on the surface of the low refractive index layer, failing to impart sufficient scratch resistance. The solid silica fine particles in an amount of more than 100 parts by mass may make it difficult to adjust the reflectance to be low, and may also cause the low refractive index layer to have insufficient flatness.

The lower limit of the amount of the solid silica fine particles in the low refractive index layer is more preferably 20 parts by mass and the upper limit thereof is more preferably 90 parts by mass, still more preferably 80 parts by mass, particularly preferably 60 parts by mass.

The solid silica fine particles preferably have, on the surface, a functional group having reactivity with the later-described binder resin, for example a functional group having an ethylenically unsaturated bond. The presence of the reactive functional group on the surface allows the low refractive index layer to have excellent hardness.

In the optical layered body of the present invention, the low refractive index layer may contain additives to the extent that does not impair the hardness.

Any additive may be used. Examples thereof include fluorine compounds, silicone compounds, and silicone- and fluorine atom-containing compounds. These additives may be used alone or in combination of two or more thereof. For example, materials well compatible with additives contained in the undercoat layer of the low refractive index layer may be appropriately selected from the above compounds and combined.

The low refractive index layer containing any of the fluorine compounds, silicone compounds, and silicone- and fluorine atom-containing compounds allows the optical layered body of the present invention to have excellent blocking resistance because the optical layered body has excellent antiglare properties and projections and depressions (particularly projections) even when it has, on the surface, the low refractive index layer having very high smoothness in a specific region of the surface other than the projections. The above compounds in the optical layered body of the present invention are presumably present at high concentrations on the surface of the low refractive index layer, that is, the air interface. The additives thus function also as antifoulants. The optical layered body of the present invention thus has excellent antifouling performance.

The silicone compounds are not limited. Examples thereof include organic silicones. The organic silicones are not limited, but preferably have a reactive functional group in the molecule. An organic silicone having a reactive functional group can react with the later-described binder component and is suitably prevented from falling off from the low refractive index layer.

Examples of the organic silicone having a reactive functional group include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethyl silicone, phenyl methyl silicone, alkyl-aralkyl-modified silicone, fluorosilicone, polyether-modified silicone, fatty acid ester-modified silicone, methyl hydrogen silicone, silanol group-containing silicone, alkoxy group-containing silicone, phenol group-containing silicone, (meth)acrylic-modified silicone, amino-modified silicone, carboxylic acid-modified silicone, carbinol-modified silicone, epoxy-modified silicone, mercapto-modified silicone, fluorine-modified silicone, and polyether-modified silicone. In particular, those having a dimethylsiloxane structure are preferred because they are less likely to bleed out from the low refractive index layer.

The amount of the organic silicone is appropriately determined according to the target antiblocking performance and antifouling performance of the low refractive index layer.

The amount of the organic silicone is preferably 1 to 10 parts by mass relative to 100 parts by mass of the total of the above hollow silica fine particles and the later-described binder component. The organic silicone in an amount of less than 1 part by mass may not impart sufficient antiblocking performance and antifouling performance to the formed low refractive index layer. The organic silicone in an amount of more than 10 parts by mass may cause bleeding out of the added organic silicone from the low refractive index layer. The organic silicone in such an amount also may not have an effect commensurate with the added amount, and may increase the production cost, impair the hardness and appearance of the low refractive index layer, and increase the reflectance. The lower limit of the amount of the organic silicone is more preferably 2 parts by mass and the upper limit thereof is more preferably 8 parts by mass.

Examples of the fluorine compound that also functions as an antifoulant include compounds having a reactive functional group and a fluorine atom. Examples of the silicone- and fluorine atom-containing compound include compounds having a reactive functional group, a fluorine atom, and a silicon atom. The formed low refractive index layer containing such an antifoulant can have further improved antifouling performance.

The compound having a reactive functional group and a fluorine atom may be, for example, a reactive fluorine compound. In particular, fluorine-containing monomers having an ethylenically unsaturated bond can be widely used. Specific examples thereof include fluoroolefins (e.g., fluoroethylene, vinylidene fluoride, tetrafluoroethylene, hexafluoropropylene, perfluoro butadiene, perfluoro-2,2-dimethyl-1,3-dioxole).

Examples also include: (meth)acrylate compounds having a fluorine atom in the molecule such as 2,2,2-trifluoroethyl (meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, and α-trifluoromethyl (meth)acrylate; and fluorine-containing polyfunctional (meth)acrylate ester compounds having at least three fluorine atoms in the molecule and having a C1-C14 fluoroalkyl, fluoro cycloalkyl, or fluoro alkylene group and at least two (meth)acryloyloxy groups.

Examples also include fluorine polymers and oligomers having a fluorinated alkylene group in the main chain and fluorinated polymers and oligomers having a fluorinated alkylene group or a fluorinated alkyl group in the main and side chains. Particularly suitable are fluorinated polymers having a fluorinated alkylene group or a fluorinated alkyl group in the main and side chains because such polymers are less likely to bleed out from the low refractive index layer.

Examples of the compound having a reactive functional group, a fluorine atom, and a silicon atom include: silicone-containing vinylidene fluoride copolymers obtained by reacting any of the above reactive fluorine compounds with any of the above organic silicones having a reactive functional group in the molecule; and fluorine-modified organic silicone compounds.

In the optical layered body of the present invention, the low refractive index layer may contain an antifoulant other than the fluorine compounds, silicone compounds, and silicone- and fluorine atom-containing compounds to the extent that does not impair the effects of the present invention.

The low refractive index layer further containing the antifoulant allows the optical layered body of the present invention to have better antifouling performance.

The low refractive index layer preferably contains a binder component.

Examples of the binder component include ionizing radiation-curable resins. In the present invention, a (meth)acrylic resin is particularly suitably used. The "(meth)acrylic" as used herein means acrylic or methacrylic.

Examples of the (meth)acrylic resin include polymers and copolymers of (meth)acrylic monomers. Suitable examples of the (meth)acrylic monomer include, but not limited to, polyfunctional acrylates such as pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, ditrimethylolpropane tetra(meth)acrylate, and isocyanuric acid EO-modified tri(meth)acrylate.

These (meth)acrylate monomers may be modified at part of the molecular skeleton. Those modified with ethylene oxide, propylene oxide, caprolactone, isocyanuric acid, an alkyl, a cyclic alkyl, an aromatic, bisphenol, or the like may also be used.

These (meth)acrylic monomers may be used alone or in combination of two or more thereof. These (meth)acrylic monomers satisfy the later-described refractive index range while having excellent curing reactivity, and can improve the hardness of the low refractive index layer to be obtained.

The (meth)acrylic monomer preferably has a refractive index of 1.47 to 1.53. A refractive index of lower than 1.47 is virtually impossible to achieve, and a refractive index higher than 1.53 may prevent the low refractive index layer from having a sufficiently low refractive index.

The (meth)acrylic monomer preferably has a weight average molecular weight of 250 to 1000. A (meth)acrylic monomer having a weight average molecular weight of less than 250 has fewer functional groups, and thus may reduce the hardness of the low refractive index layer. A (meth)acrylic monomer having a weight average molecular weight of more than 1000 generally has a smaller functional group equivalent (number of functional groups/molecular weight), which may lead to low crosslinking density and causes the resulting low refractive index layer to have insufficient hardness.

The weight average molecular weight of the (meth)acrylic monomer can be determined by gel permeation chromatography (GPC) using a polystyrene standard. A solvent such as tetrahydrofuran or chloroform may be used for the GPC mobile phase. Commercially available columns for tetrahydrofuran or chloroform may be used in combination as the measurement columns. Examples of the commercially available columns include Shodex GPC KF-801 and GPC KF-800D (product names, available from Showa Denko K.K.). The detectors may be an RI (differential refractive index) detector and a UV detector. With the solvent, columns, and detectors, the weight average molecular weight is appropriately measured with a GPC system such as Shodex GPC-101 (available from Showa Denko K.K.).

In the optical layered body of the present invention, the surface of the low refractive index layer preferably has a rate of change in water contact angle before and after saponification treatment of 15% or less. When the rate of change in water contact angle is more than 15%, the organic silicone on the surface of the low refractive index layer may fall off, causing the optical layered body of the present invention to have insufficient antiblocking performance and soil resistance. The upper limit of the rate of change in water contact angle of the surface of the low refractive index layer is more preferably 10%, still more preferably 5%.

The rate of change in water contact angle of the surface of the low refractive index layer before and after saponification treatment can be obtained by measuring the water contact angle before and after the saponification treatment of the low refractive index layer with a contact angle meter and calculating the rate of change by the equation: {(Measured value before treatment−Measured value after treatment)/Measured value before treatment}×100.

In the optical layered body of the present invention, the low refractive index layer preferably has a refractive index of less than 1.45. A low refractive index layer having a refractive index of 1.45 or more may cause the optical layered body of the present invention to have insufficient antireflective performance. The lower limit of the refractive index is more preferably 1.15. To achieve good physical strength, the lower limit is preferably 1.20. To achieve good display quality, the upper limit of the refractive index of the low refractive index layer is preferably 1.40. To adapt to the high-level display quality of the recent image display devices, the upper limit is particularly preferably 1.36.

The low refractive index layer preferably has a thickness (nm) $d_A$ satisfying Equation (I):

$$d_A = m\lambda/(4\,n_A) \qquad (I)$$

(In the equation, $n_A$ represents the refractive index of the low refractive index layer, m represents a positive odd number, preferably 1, and $\lambda$ represents a wavelength, preferably a wavelength within a range of 480 to 580 nm).

In the present invention, to reduce the reflectance, the refractive index layer preferably satisfies Inequality (II):

$$120 < n_A d_A < 145 \qquad (II).$$

The low refractive index layer can be formed by preparing and using a composition for a low refractive index layer. The composition contains components such as the hollow silica fine particles, the solid silica fine particles, the monomer component of the binder component, and the fluorine compound, silicone compound, and silicone- and fluorine atom-containing compound, and other optional components such as an antifoulant.

The composition for a low refractive index layer may further contain a solvent.

Any solvent may be used. Examples thereof include alcohols such as methanol, ethanol, propanol, isopropyl alcohol, n-butanol, s-butanol, t-butanol, benzyl alcohol, and PGME; ketones such as acetone, methyl ethyl ketone, methyl isobutyl ketone, cyclohexanone, heptanone, diisobutyl ketone, and diethyl ketone; esters such as methyl acetate, ethyl acetate, propyl acetate, butyl acetate, methyl formate, ethyl formate, propyl formate, butyl formate, and PGMEA; aliphatic hydrocarbons such as hexane and cyclohexane; hydrocarbon halides such as methylene chloride, chloroform, and carbon tetrachloride; aromatic hydrocarbons such as benzene, toluene, and xylene; amides such as dimethylformamide, dimethylacetamide, and n-methylpyrrolidone; ethers such as diethyl ether, dioxane, and tetrahydrofuran; and ether alcohols such as 1-methoxy-2-propanol. Preferred among these are methyl isobutyl ketone, methyl ethyl ketone, isopropyl alcohol (IPA), n-butanol, s-butanol, t-butanol, PGME, and PGMEA.

The composition for a low refractive index layer may optionally contain other components.

Examples of such other components include photopolymerization initiators, leveling agents, cross-linking agents, curing agents, polymerization accelerators, viscosity modifiers, antistatic agents, ultraviolet absorbers, light absorption wavelength modifiers, pigments, dyes, and resins other than the above-described resins.

In the case where the composition for a low refractive index layer contains a resin having a radical polymerizable unsaturated group, examples of the photopolymerization initiator include acetophenones (e.g., 1-hydroxy-cyclohexyl-phenyl-ketone commercially available under the product name of IRGACURE 184 (available from BASF)), benzophenones, thioxanthones, benzoin, and benzoin methyl ether. These may be used alone or in combination of two or more thereof.

In the case where the composition for a low refractive index layer contains a resin having a cationically polymerizable functional group, examples of the photopolymerization initiator include aromatic diazonium salts, aromatic sulfonium salts, aromatic iodonium salts, metallocene compounds, and benzoin sulfonates. These may be used alone or in combination of two or more thereof.

Specific examples of photopolymerization initiators that can be used in the present invention include IRGACURE 184, IRGACURE 907, IRGACURE 369, IRGACURE 379, IRGACURE 819, IRGACURE 127, IRGACURE 500, IRGACURE 754, IRGACURE 250, IRGACURE 1800, IRGACURE 1870, IRGACURE OXE01, IRGACURE OXE02, DAROCUR TPO, and DAROCUR 1173 available from Ciba Specialty Chemicals; Speedcure MBB, Speedcure PBZ, Speedcure ITX, Speedcure CTX, Speedcure EDB, Esacure ONE, Esacure KIP150, and Esacure KTO 46 available from Nihon SiberHegner K.K.; and KAYACURE DETX-S, KAYACURE CTX, KAYACURE BMS, and KAYACURE DMBI available from Nippon Kayaku Co., Ltd. Preferred among these are IRGACURE 369, IRGACURE 127, IRGACURE 907, Esacure ONE, Speedcure MBB, Speedcure PBZ, and KAYACURE DETX-S.

The amount of the photopolymerization initiator added is preferably 0.1 to 10 parts by mass relative to 100 parts by mass of the solid content of the binder resin.

Any known leveling agents, cross-linking agents, curing agents, polymerization accelerators, viscosity modifiers, antistatic agents, ultraviolet absorbers, light absorption wavelength modifiers, pigments, dyes, and other resins can be used.

The composition for a low refractive index layer has a viscosity in the range of 0.5 to 5 cps (25° C.), preferably 0.7 to 3 cps (25° C.) to achieve preferable coatability. The composition for a low refractive index layer having such a viscosity can provide an excellent antireflection film for visible light, can form a uniform thin film without coating unevenness, and can form a low refractive index layer having particularly excellent adhesiveness to a coating target.

The method for preparing the composition for a low refractive index layer is not limited. For example, the composition can be prepared by mixing the above-described components such as the hollow silica fine particles, the monomer component of the binder component, the organic silicone, and other optional components such as an antifoulant, a solvent, and a photopolymerization initiator. The components may be mixed using a known device such as a paint shaker, a bead mill, a kneader, or a mixer.

The low refractive index layer can be prepared by applying the composition for a low refractive index layer to the later-described antiglare layer, optionally drying the formed coating film, and curing the coating film by irradiation such as ionizing radiation and/or heating.

The method for applying the composition for a low refractive index layer is not limited. Examples thereof include various methods such as a spin coating method, a dipping method, a spraying method, a die-coating method, a bar-coating method, a roll coating method, a meniscus coating method, a flexographic printing method, a screen printing method, and a bead coating method.

The light-transmitting substrate preferably has smoothness, heat resistance, and excellent mechanical strength. Specific examples of materials forming the light-transmitting substrate include thermoplastic resins such as polyesters (e.g., polyethylene terephthalate, polyethylene naphthalate), cellulose triacetate, cellulose diacetate, cellulose acetatebutyrate, polyamide, polyimide, polyether sulfone, polysulfone, polypropylene, polymethyl pentene, polyvinyl chloride, polyvinyl acetal, polyether ketone, acrylic resins such as polymethyl methacrylate (PMMA), polycarbonate, and polyurethane. Preferred among these are polyesters (e.g., polyethylene terephthalate, polyethylene naphthalate), cellulose triacetate, and polymethyl methacrylate (PMMA). The resin materials forming the light-transmitting substrate may be used alone or in combination of two or more thereof.

The light-transmitting substrate is preferably a highly flexible film of any of the above thermoplastic resins. Yet, it may be a plate of any of the thermoplastic resins if the intended use requires hardness, or may be a plate such as a glass plate.

Other examples of the light-transmitting substrate include alicyclic amorphous olefin polymer (cyclo olefin polymer: COP) films. These are substrates produced using a compound such as a norbornene polymer, a monocyclic olefin polymer, a cyclic conjugated diene polymer, or a vinyl alicyclic hydrocarbon polymer. Examples thereof include ZEONEX and ZEONOR (COP) available from Zeon Corporation; SUMILITE FS-1700 available from Sumitomo Bakelite Co., Ltd.; ARTON (modified norbornene resin) available from JSR; APEL (cyclic olefin copolymer) available from Mitsui Chemicals, Inc.; Topas (cyclic olefin copolymer) available from Ticona; and OPTOREZ OZ-1000 series (cyclic acrylic resins) available from Hitachi Chemical Co., Ltd.

Other preferred alternative substrates for triacetyl cellulose are FV series (low birefringence, low photoelastic film) available from Asahi Kasei Chemicals Corporation.

The thickness of the light-transmitting substrate in a film form is preferably 5 to 300 µm. The lower limit thereof is more preferably 10 µm, still more preferably 15 µm and the upper limit thereof is more preferably 200 µm. When a thinner film is desired, the upper limit is still more preferably 90 µm, particularly preferably 70 µm, most preferably 50 µm. The light-transmitting substrate in a plate form may have a thickness out of these ranges.

Before layers such as the antiglare layer are formed on the light-transmitting substrate, the substrate may be subjected to a physical or chemical treatment such as corona discharge treatment or oxidation treatment, and may be coated with a coating material called an anchoring agent or primer, for improvement of adhesion.

Materials frequently used for light-transmitting substrates for LCDs are triacetylcellulose, polymethyl methacrylate, polyester, norbornene resins, and cyclic olefin resins. Materials used for light-transmitting substrates for OLEDs include polyimide film (which may contain polyamide instead of polyimide alone) in addition to the light-transmitting substrates for LCD. When these materials are used and a thinner display is desired, the thickness of the light-emitting substrate is preferably 7 to 45 µm. When an even thinner display is desired, the upper limit of the light-transmitting substrate is more preferably 30 μm. When the substrate contains a resin that can be made even thinner, (e.g., COP, polyimide film), the upper limit is preferably 20 μm.

The antiglare layer is formed on one surface of the light-transmitting substrate and has projections and depressions on a surface thereof.

The method for forming the projections and depressions of the antiglare layer is not limited. For example, the projections and depressions may be formed by the use of a composition containing an antiglare agent, phase separation of a binder resin, or embossing.

In particular, the projections and depressions of the antiglare layer are preferably formed by the use of a composition for an antiglare layer containing an antiglare agent and a binder resin.

The antiglare agent is in the form of fine particles, and may have any shape such as a perfectly spherical shape, an elliptic shape, or an indeterminate shape. Examples of antiglare agents that can be used include: organic fine particles; and inorganic fine particles and/or inorganic components. Transparent fine particles are preferred.

The organic fine particles may be made of any material. Examples thereof include polystyrene resins, melamine resins, acrylic resins, styrene-acrylic copolymers, benzoguanamine-formaldehyde condensates, melamine-formaldehyde condensates, polycarbonate resins, polyethylene resins, urethane resins, epoxy resins, silicone resins, polyvinylidene fluoride resins, and polyfluoroethylene resins. The organic fine particles are preferable as a base material to form relatively large bases of the projections and depressions, particularly the projections.

The inorganic fine particles may be made of any material. Examples thereof include silica, alkali metal oxides, alkaline earth oxides, titanium oxide, zinc oxide, aluminum oxide, boron oxide, tin oxide, phosphorus oxide, indium tin oxide, zirconium oxide, other metal oxides, metals, metal nitrides, carbon isotopes, silicic acid fine powder, calcium silicate, aluminum silicate, calcium carbonate, magnesium carbonate, talc fine powder, titanium oxide, diatomite, smectite, and kaolin clay.

The inorganic components may be made of any material. Examples thereof include silica sol, metal oxide sols such as zirconia sol, Aerosil, and clay components such as swellable clay.

Agglomerates of the inorganic fine particles and/or inorganic component alone can be used as the bases of the projections and depressions, particularly the projections. When the organic fine particles are used to form the projection and depression bases, it is preferred that the inorganic fine particles and/or inorganic component are/is present around the organic fine particles or that the agglomerates of the inorganic fine particles and/or inorganic component are present between organic fine particles (between non-agglomerated organic fine particles separated by a distance of at least three times the average particle size of the organic fine particles) to form a flat shape in a specific region to improve scratch resistance.

The antiglare agents may be used alone, or two or more thereof may be used at the same time.

The agglomeration in the present invention includes not only a grouping of fine particle in which fine particles are in close contact with each other somewhere around the 360° circumference of a fine particle, but also a grouping of fine particle in which fine particles gather together somewhere around the 360° circumference of a fine particle with the distance between the fine particles being less than three times the average size of the fine particles. In particular, since the fine particles in the antiglare layer are surrounded with the binder resin, an agglomerate containing the binder between fine particles is presumably more likely to be formed than an agglomerate of fine particles in complete contact with each other.

The inorganic fine particles may be conducting metal oxide fine particles. The conducting metal oxide fine particles are not limited. Examples thereof include Zno, $Sb_2O_2$, $SnO_2$, $CeO_2$, indium tin oxide, $In_2O_3$, $Al_2O_3$, antimony-doped tin oxide, and aluminum-doped zinc oxide.

The materials of the organic fine particles, the inorganic fine particles, and the inorganic component may be used at the same time, and may be used in combination of two or more thereof.

The organic fine particles or the inorganic fine particles and/or inorganic component may have a core/shell structure. In this case, the shell may have a polymerizable functional group introduced to the surface. Examples of the shell structure include: a structure in which a polymerizable functional group is directly bonded to the core by chemical reaction, or a polymerizable functional group-containing monomer, oligomer, or polymer in a graft form is bonded to the core by chemical reaction; and a structure in which a polymerizable functional group-containing monomer, oligomer, or polymer in a coating film form is bonded to the surface of the particle portion (core) by chemical reaction.

To suitably control the shape in a specific region of the low refractive index layer stacked on the antiglare layer, it is important to suitably control the projections and depressions on the surface of the antiglare layer. A preferred exemplary antiglare layer contains one or two or more antiglare materials such as the organic fine particles and the inorganic fine particles and/or inorganic components, and further contains a binder resin. For the low refractive index layer stacked on the antiglare layer to have good surface irregularities, it is preferred to control relatively large projections serving as the bases of the projections and depressions on the surface of the antiglare layer, and minimize the number of particle-derived projections and depressions on the surface between the projections.

When forming such a surface shape of the antiglare layer using any of the antiglare materials alone, the antiglare layer preferably has a thickness at least 1.5 times greater than the average particle size. When the antiglare material is in the form of agglomerate particles, the antiglare layer preferably has a thickness at least 1.5 times greater than the average particle size of the agglomerates. In the case where the projections of the antiglare layer are formed of the organic fine particles, for example, the fine particles may exist singly, but in many cases, several fine particles gather with a small distance therebetween. In other words, two or more densely gathered fine particles tend to form a projection when the surface of the antiglare layer is at least observed. The antiglare layer having a thickness greater than the average particle size allows sufficient binder resin to exist on single fine particles other than the fine particles groupings forming such relatively large projections (or on fine particle groupings smaller than the large fine particle groupings forming the relatively large projections). This makes it easy to control the surface shape between the projections. The binder resin used at this time preferably has high viscosity. The viscosity of the binder resin can be adjusted by adjusting, for example, the viscosity of the binder resin itself, the solid content of the solute in the solvent, or the drying conditions in the production process. The binder resin and solvent may be appropriately selected from those described later and mixed.

The "using any of the antiglare materials alone" means that two types of antiglare materials including the organic fine particles and the inorganic fine particles and/or inorganic component are not mixed. Here, for example, mixing organic fine particles of different resin materials, such as acrylic resin fine particles and styrene-acrylic copolymer fine particles, or mixing different size organic fine particles is regarded as using organic fine particles alone.

When the antiglare layer contains the binder resin and multiple types of antiglare agents including the inorganic fine particles and/or inorganic component and the organic fine particles, the projections and depressions on the surface may be formed of the organic fine particles and the later-described agglomerates of the inorganic fine particles and/or inorganic component. The antiglare layer formed in this manner can have, on the surface, projections and depressions controlled such that less particle-derived projections and depressions are present on the surface between the main projections.

This is presumably because of a specific distribution of the inorganic fine particles and/or inorganic component and the organic fine particles in the antiglare layer as described later.

The organic fine particles in this case preferably have a particle size greater than the inorganic fine particles and/or inorganic component.

The inorganic fine particles and inorganic component preferably have a particle size of 10% or less of the average particle size of the organic fine particles. Here, this preferable particle size is for inorganic fine particles and inorganic components having a spherical or indeterminate shape with a major axis/minor axis of less than 5. Those having an indeterminate shape with a major axis/minor axis of 5 or more or having a flake shape are not limited to have such a particle size and may be greater or smaller than the organic fine particles.

The inorganic fine particles and/or inorganic component preferably include(s) those contained sparsely and densely in the antiglare layer in the form of agglomerates. The agglomerates of the inorganic fine particles and/or inorganic component distributed sparsely and densely in the antiglare layer are preferred because they allow the antiglare layer to have a suitable surface state at the surface other than the projections among the projections and depressions. Such a surface state makes it easy to achieve good flatness in any 5-μm square region of the surface of the low refractive index layer to improve scratch resistance when the low refractive index layer is stacked.

The phrase "dispersed sparsely and densely in the antiglare layer" means the presence of multiple regions where the agglomerates of inorganic fine particles and/or inorganic component are distributed densely and multiple regions where the agglomerates of inorganic fine particles and/or inorganic component are distributed sparsely in the antiglare layer. In other words, the agglomerates of inorganic fine particles and/or inorganic component are distributed unevenly in the antiglare layer.

As used herein, the "region where the agglomerates of inorganic fine particles and/or inorganic component are distributed densely" is defined as a region where the proportion of the area of the agglomerates of inorganic fine particles and/or inorganic component is at least 5% in a 2-μm square observation region in one image of any cross section of the antiglare layer in the thickness direction observed by an electron microscope (preferably of a transmission type such as TEM or STEM, used under the above observation conditions, for example) at 10000 times magnification. The "region where the agglomerates of inorganic fine particles and/or inorganic component are distributed sparsely" is defined as a region where the proportion of the area of the agglomerates of inorganic fine particles and/or inorganic component in a 2-μm square observation region is less than 1%.

The region where the agglomerates of inorganic fine particles and/or inorganic component are distributed densely or the region where the agglomerates of inorganic fine particles and/or inorganic component are distributed sparsely, namely, the regions to be observed by an electron microscope at 10000 times magnification may be determined by observing the distribution state of the inorganic fine particles and/or inorganic component in a cross section of the antiglare layer in the thickness direction with an electron microscope at lower magnification (about 3000 times magnification).

Such distribution of the agglomerates of inorganic fine particles and/or inorganic component is easily determined by observing a cross section of the antiglare layer in the thickness direction with an electron microscope. The proportion of the area of the agglomerates of the inorganic fine particles and/or inorganic component can be calculated using image analysis software.

The image analysis software may be, for example, Win-Roof (product name) available from Mitani Corporation. The software can calculate the proportion by binarizing the image of the 2-μm square region observed at 10000 times magnification.

The inorganic fine particles are preferably surface-treated. Surface treatment on the inorganic fine particles allows suitable control of the degree of the dense and sparse distributions of the agglomerates of inorganic particles in the antiglare layer and control of the effect provided by the dense distribution around organic fine particles within a proper range. Surface treatment also can improve the chemical resistance and saponification resistance of the inorganic fine particles themselves.

The surface treatment is preferably hydrophobization. For example, the inorganic fine particles may be treated with a hydrophobic agent such as a silane compound having an alkyl group.

Examples of the alkyl group include methyl, ethyl, propyl, butyl, hexyl, and octyl groups. Examples of the silane compound having an alkyl group include methyltrichlorosilane, dimethyldichlorosilane, trimethylchlorosilane, trimethylsilanol, hexamethyldisilazane, methyltrimethoxysilane, methyltriethoxysilane, ethyltriethoxysilane, propyltrimethoxysilane, butyltrimethoxysilane, and octyltrimethoxysilane.

Examples of preferred materials of the inorganic fine particles include silica, alkali metal oxides, alkaline earth oxides, titanium oxide, zinc oxide, aluminum oxide, boron oxide, tin oxide, phosphorus oxide, indium tin oxide, and zirconium oxide. Silica fine particles are particularly versatile as inorganic fine particles.

The silica fine particles commonly have a hydroxy group (silanol group) on the surface. The surface treatment reduces the number of hydroxy groups on the surface of the silica fine particles to prevent excessive agglomeration of the silica fine particles, thereby exerting the above effect.

The agglomeration of the silica fine particles is also preferably controlled by adjusting the degree of hydrophobization of the surface of the silica fine particles through appropriate determination of the type of the hydrophobic agent. For example, a silane compound having an alkyl group with a longer alkyl chain exhibits a larger steric hindrance effect, thereby lowering the degree of hydrophobization of the surface of the silica fine particles.

The silica fine particles are preferably made of amorphous silica. Silica fine particles made of crystalline silica have high Lewis acidity due to lattice defects in the crystal structure, and may make it impossible to control excessive agglomeration of the silica fine particles as mentioned above.

The silica fine particles are preferably fumed silica as it is easily agglomerated to form the later-described agglomerates. The fumed silica refers to amorphous silica having a particle size of 200 nm or less prepared by a dry method. Such silica is prepared by a reaction of a volatile compound containing silicon in a gas phase. Specific examples of such silica include those prepared by hydrolizing a silicon compound (e.g., $SiCl_4$) in oxygen/hydrogen flame. Specific examples thereof include AEROSIL R805 (available from Nippon Aerosil Co., Ltd.).

The amount of the silica fine particles is not limited and is preferably 0.1 to 5.0% by mass in the antiglare layer. The silica fine particles in an amount of less than 0.1% by mass may not sufficiently form the above dense distribution around the organic fine particles, and thus may be less likely to form the antiglare layer surface state preferable for improvement of scratch resistance. The silica fine particles in an amount of more than 5.0% by mass may form excessive agglomerates to cause internal diffusion, which may reduce transparency and cause whitish appearance. The lower limit of the amount is more preferably 0.5% by mass and the upper limit thereof is more preferably 3.0% by mass.

The silica fine particles preferably have an average particle size of 1 to 100 nm. Silica fine particles having an average particle size of less than 1 nm may not sufficiently form the above dense distribution around the organic fine particles. Silica fine particles having an average particle size of more than 100 nm may not sufficiently form the above dense distribution around the organic fine particles. The lower limit is more preferably 5 nm and the upper limit is more preferably 50 nm.

The average particle size of the silica fine particles can be determined by averaging the particles sizes of randomly selected 50 particles that are visually measured in an image of a cross section obtained with an electron microscope (preferably of a transmission type such as TEM or STEM, at at least 1 to 100000 times magnification). Alternatively, the average particle size may be calculated using image processing software (e.g., product name WinRoof available from Mitani Corporation). Both methods provide the substantially same results because both use cross sectional observation images.

The agglomerates of the silica fine particles may have a string-of-beads-like structure (shape like a pearl necklace) in which the silica fine particles are linked to each other.

Silica fine particles linked to each other to form string-of-beads-like agglomerates in the antiglare layer can form a suitable surface state at the surface of the antiglare layer other than the projections among the projections and depressions as described later.

The string-of-beads-like structure in which the silica fine particles are linked to each other may be any structure such as a structure in which the silica fine particles are linearly linked (straight-chain structure), a structure in which multiple straight-chain structures are intertwined with each other, and a branch structure in which the straight-chain structure has one or two or more side chains formed of silica fine particles linked to each other.

The agglomerates of the silica fine particles preferably have an average particle size of 100 nm to 2 µm. Agglomerates of the silica fine particles having an average particle size of less than 100 nm may not sufficiently exhibit the later-described buffering effect in formation of the projections and depressions by curing shrinkage. Agglomerates of the silica fine particles having an average particle size of more than 2 µm may not sufficiently form the above dense distribution around the organic fine particles. In addition, such agglomerates of the silica fine particles may scatter light, or may form too large projections and depressions, lowering the bright-room and dark-room contrasts of an image display device. The lower limit of the average particle size of the agglomerates is more preferably 200 nm and the upper limit thereof is more preferably 1 µm. In many cases, the average particle sizes of 2 µm and 1 µm represent the length of the major axis of the agglomerates because the agglomerates have indeterminate shapes.

The average particle size of the agglomerates of the silica fine particles is determined by selecting a 5-µm square region including many agglomerates of the silica fine particles by electron microscopy (at about 10000 to 20000 times magnification) of a cross section, measuring the particle sizes of the agglomerates of the silica fine particles in the region, and averaging the top 5 particle sizes of the agglomerates of the silica fine particles excluding the largest. In determining the "particle size of the agglomerate of silica fine particles", the cross section of the agglomerate of silica fine particles is sandwiched with two parallel lines. The distance between two lines that have the maximum distance therebetween is regarded as the particle size of the agglomerate. The particle size of the agglomerate of the silica fine particles may also be calculated using image analysis software.

The silica fine particles preferably form agglomerates that are densely distributed around the organic fine particles contained in the antiglare layer.

The agglomerates of the silica fine particles are preferably contained in the antiglare layer sparsely and densely as described above. The antiglare layer preferably has a region where many agglomerates of the silica fine particles are present around the organic fine particles and a region where only the agglomerates of the silica fine particles are densely distributed. For example, a state where the agglomerates of the silica fine particles are densely distributed around the organic fine particles is easily observed by electron microscopy of a cross section of the antiglare layer.

In electron microscopy of a cross section of the antiglare layer, agglomerates of the silica fine particles densely distributed around an organic fine particle are observed not only in a cross section through the center of the organic fine particle, but also in an off-center cross section of the organic fine particle.

The state where "agglomerates of the silica fine particles are densely distributed around an organic fine particle" refers to a state where the proportion of the area of the agglomerates of the silica fine particles is at least 10% in a region within a circle surrounding the organic fine particle at a distance of 200 nm from the organic fine particle (excluding the region corresponding to the organic fine particle) in microscopy of a cross section of the antiglare layer in the thickness direction where the organic fine particles are observed using an electron microscope (preferably of a transmission type such as TEM or STEM) at 20000 times magnification.

The antiglare layer containing the agglomerates of the silica fine particles and the organic fine particles allows the low refractive index layer stacked on the antiglare layer to have good surface irregularities and a shape that enables control of the Ra and Rz in a specific region, thus advantageously improving scratch resistance. Such a shape is achieved presumably for the following reason.

When the composition for an antiglare layer is applied and dried to evaporate the solvent, a binder resin having low viscosity tends to follow the shape of the organic fine particles. Further, a binder resin containing only a polyfunctional monomer may shrink in volume in curing. Since the polymer-form organic fine particles do not shrink, only the binder resin shrinks, causing formation of steep slopes in relatively large projections formed on the surface of the positions corresponding to agglomerates of two or more organic fine particles, for example. In addition, between such relatively large projections serving as the bases of projections and depressions, smaller projections may be likely to be formed due to single organic fine particles and the like.

However, the agglomerates of the silica fine particles densely distributed around the organic fine particles increase the viscosity around the organic fine particles in the composition for an antiglare layer. As a result, the binder resin is less likely to follow the shape of the organic fine particles when the solvent is evaporated, and also the binder of the portion (containing the binder resin and the silica fine particles) is less likely to shrink on curing. Furthermore, the silica fine particles are agglomerated sparsely together with the binder resin, so that they have a buffering effect against curing shrinkage. This prevents the formation of the steep slopes in the relatively large projections formed on the surface of the positions corresponding to agglomerates of multiple organic fine particles. The agglomerates having a buffering effect also surround single organic particles (or agglomerates smaller than the fine particle agglomerates forming the relatively large projections), allowing the portions between the relatively large projections, namely, the surface other than the projections, to have high flatness.

This presumably facilitates a preferable control of the state of the surface other than the projections among the projections and depressions formed of the organic fine particles on the surface of the antiglare layer. Although the above reason is described using silica fine particle as an example, not only silica fine particles but also other inorganic fine particles and/or inorganic components above are considered to form agglomerate when used with the organic fine particles, and form a good surface shape of the antiglare layer by the same mechanism.

As described above, an antiglare layer composition containing only organic fine particles can form an antiglare layer having a suitable surface state if the binder resin viscosity and the thickness are controlled.

When comparing an antiglare layer composition containing only organic fine particles with an antiglare layer composition containing inorganic fine particles and/or an inorganic component in addition to organic fine particles, the latter is better in that it allows various surface shape designs because the properties such as composition viscosity can be freely adjusted independently of the inherent physical properties of the binder resin itself.

In the antiglare layer, the single organic fine particles and single silica fine particles are preferably spherical. Such spherical single organic fine particles and single silica fine particles allow an image display device to provide high-contrast display images when the antiglare layer is applied to the device.

The "spherical" refers to perfectly spherical, ellipsoidal, and the like shapes, namely, shapes excluding indeterminate shapes.

The organic fine particles are fine particles that mainly form the surface projections and depression of the antiglare layer and whose refractive index and particle size are easy to control. The presence of such organic fine particles in the antiglare layer facilitates the control of the size of the projections and depression formed on the antiglare layer. In addition, the difference in refractive index between the organic fine particles and the binder resin is easy to control, so that the antiglare properties can be controlled and the antiglare layer can maintain transparency to reduce whitish appearance.

The amount of the organic fine particles is preferably 0.5 to 10.0% by mass in the antiglare layer. The organic fine particles in an amount of less than 0.5% by mass may provide insufficient antiglare properties. The organic fine particles in an amount of more than 10.0% by mass are less likely to provide the surface state of the antiglare layer that can improve scratch resistance, may reduce transparency to cause whitish appearance, and also may cause an image display device to display images with poor contrast when the optical layered body is used in the device. The lower limit of the amount is more preferably 1.0% by mass and the upper limit thereof is more preferably 8.0% by mass.

The size of the organic fine particles is appropriately determined in accordance with, for example, the thickness of the antiglare layer. For example, the average particle size is preferably 0.3 to 5.0 µm. Organic fine particle having an average particle size of less than 0.3 µm may makes it impossible to control the dispersibility of the organic fine particles. Organic fine particle having an average particle size of more than 5.0 µm may form too large projections on the antiglare layer, and thus may be less likely to form the surface state of the antiglare layer that can improve scratch resistance. The lower limit of the average particle size is more preferably 1.0 µm and the upper limit thereof is more preferably 3.0 µm.

The average particle size of the organic fine particles is preferably 20 to 60% relative to the thickness of the antiglare layer. Organic fine particles having an average particle size of more than 60% may protrude above the surface of the coating film layer and form too large projections. Organic fine particles having an average particle size of less than 20% may not form sufficient projections on the antiglare layer, resulting in insufficient antiglare properties.

The average particle size of the organic fine particles in the antiglare layer is determined as the average of the maximum sizes of particles by transmission optical microscopy of the antiglare layer. In this case, an about 2-cm square optical layered body is fixed to glass slide with tape, for example, and three seemingly homogeneous surface portions without foreign matter, scratches, or the like are observed at 200 to 500 times magnification. The maximum sizes of 15 particles in the field of view are measured and the arithmetic average thereof is determined as the average particle size of the organic fine particles.

If such a method is inappropriate, the average particle size of the organic fine particles is determined as follows. In electron microscopy (preferably of a transmission type such as TEM, STEM) of cross sections taken at or near the center of the particles, any 30 particles that are seemingly of the same kind and similar particle sizes are selected (the n number is increased as it is not known which part of the particle is sectioned to give a cross section). The maximum particle sizes of the 30 particles are measured, and the average thereof is determined as the average particle size of the organic fine particles. Since all of these determinations are based on images, image analysis software may be used for calculation.

In the particles used in the antiglare layer, the weight average particle size is not greatly different from the size observed with a microscope or the like.

For example, the average particle size is determined by capturing 10 images using the SEM function of a scanning electron microscope (SEM) (product name "S-4800 (TYPE2)", available from Hitachi High-Technologies Corporation) at 1000 to 20000 times magnification, measuring the maximum sizes of any 30 particles selected in the captured images using software included with the SEM, and calculating the arithmetic average of the maximum sizes. The measurement conditions may be set as follows, for example: signal selection: "SE", accelerating voltage: "5 kV", emission current: "10 µA to 20 µA", SE detector: "Mix", probe current: "Norm", focus mode: "UHR", condenser lens 1: "5.0", W. D.: "8 mm", and tilt: "30°". The conditions are not limited thereto. Be sure to remove the TE detector because it is not used in SEM observation.

Adding a clay inorganic component, particularly swellable clay, among the inorganic components to the antiglare layer can also make it easy to adjust the state of the surface of the antiglare layer other than the projections.

The swellable clay may be any swellable clay that has cation exchange capacity and can swell by taking water between the layers thereof. The swellable clay may be a natural product or a synthetic product (including a substituted product and a derivative), or may be a mixture of a natural product and a synthetic product.

Examples of the swellable clay include mica, synthetic mica, vermiculite, montmorillonite, iron montmorillonite, beidellite, saponite, hectorite, stevensite, nontronite, magadiite, illite, kanemite, layered titanic acid, smectite, synthetic smectite, silicic acid fine powder, calcium silicate, aluminum silicate, calcium carbonate, magnesium carbonate, talc fine powder, titanium oxide, diatomite, smectite, and kaolin clay. These swellable clays may be used alone or in combination of two or more thereof.

The amount of the swellable clay is preferably 0.1 to 10% by mass, more preferably 0.2 to 5% by mass relative to 100% by mass of the solid content of the binder resin. The swellable clay in an amount of 0.1% by mass makes little change in viscosity as compared with no addition of swellable clay, thus providing an insufficient effect of controlling the state of the surface of the antiglare layer other than the projections. The swellable clay in an amount of more than 10% by mass provides an excessively high viscosity, leading to insufficient coatability.

The antiglare layer containing the swellable clay inorganic component may contain organic fine particles, inorganic fine particles, and other inorganic components in combination with the swellable clay inorganic component.

The organic fine particles, inorganic fine particles, and other inorganic components contained in combination with the swellable clay inorganic component allow various, suitable forms of control of the state of the surface of the antiglare layer other than the relatively large projections formed thereon.

The organic fine particles, inorganic fine particles, and other inorganic components may be the same as those listed above for the antiglare agent.

The binder resin is preferably transparent. For example, the binder resin is preferably an ionizing radiation-curable resin.

The "resin" as used herein encompasses monomers, oligomers, polymers, and the like unless otherwise specified.

Examples of the ionizing radiation-curable resin include compounds having one or two or more unsaturated bonds, such as compounds having an acrylate functional group. Examples of the compound having one unsaturated bond include ethyl(meth)acrylate, ethylhexyl (meth)acrylate, styrene, methylstyrene, and N-vinylpyrrolidone. Examples of the compound having two or more unsaturated bonds include polyfunctional compounds such as trimethylolpropane tri(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentylglycol di(meth)acrylate, trimethylolpropane tri(meth)acrylate, ditrimethylolpropane tetra(meth)acrylate, pentaerythritol tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth)acrylate, polyethyleneglycol di(meth)acrylate, and polypropyleneglycol di(meth)acrylate. The "(meth)acrylate" herein refers to methacrylate and acrylate. In the present invention, the ionizing radiation-curable resin may also be any of the above compounds modified with PO, EO, and the like.

In addition to the above compounds, also usable as the ionizing radiation-curable resin are polyester resins, polyether resins, acrylic resins, epoxy resins, urethane resins, alkyd resins, spiroacetal resins, polybutadiene resins, and polythiol polyene resins that each have a relatively low molecular weight and contain an unsaturated double bond.

The ionizing radiation-curable resin may be used in combination with a solvent-drying resin (resin formed into a coating film simply by drying the solvent added for adjusting the solids content in application, e.g., thermoplastic resins). The combined use of the ionizing radiation-curable resin with the solvent-drying resin can effectively prevent coating film defects on the surface coated with the coating solution during the formation of the anti-glare layer.

Any solvent-drying resin may be used in combination with the ionizing radiation-curable resin. The solvent-drying resin may usually be a thermoplastic resin.

Any thermoplastic resin may be used, and examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, phenolic resins, urea resins, diallyl phthalate resins, melamine resins, guanamine resins, unsaturated polyester resins, polyurethane resins, epoxy resins, aminoalkyd resins, melamine-urea co-condensation resins, silicon resins, silicone resins, and rubbers and elastomers. The thermoplastic resin is preferably amorphous and soluble in an organic solvent (especially a common solvent dissolving a plurality of polymers and curable compounds). From the standpoint of film formability, transparency, and weather resistance, preferred resins include styrene resins, (meth)acrylic resins, alicyclic olefin resins, polyester resins, and cellulose derivatives (cellulose esters).

The antiglare layer containing the antiglare agent and binder resin may be formed by, for example, applying a composition for an antiglare layer containing the antiglare agent, the monomer component of the binder resin, and a solvent to the light-transmitting substrate, drying the composition, and curing the formed coating film by ionizing radiation irradiation or the like.

The particle size and amount of the antiglare agent and the amount of the binder resin are not limited. They may be appropriately adjusted such that the surface shape of the later-described antiglare layer satisfies a surface state that improves scratch resistance when the low refractive index layer is stacked thereon.

Examples of the solvent contained in the composition for an antiglare layer include alcohols (e.g., methanol, ethanol, propanol, butanol, cyclohexanol, isopropyl alcohol), ketones (e.g., acetone, methyl ethyl ketone, methyl isobutyl ketone, cyclohexanone), ethers (e.g., dioxane, tetrahydrofuran), aliphatic hydrocarbons (e.g., hexane), alicyclic hydrocarbons (e.g., cyclohexane), aromatic hydrocarbons (e.g., toluene, xylene), halocarbons (e.g., dichloromethane, dichloroethane), esters (e.g., methyl acetate, ethyl acetate, butyl acetate), cellosolves (e.g., methyl cellosolve, ethyl cellosolve), cellosolve acetates, sulfoxides (e.g., dimethylsulfoxide), and amides (e.g., dimethylformamide, dimethylacetamide), and mixtures thereof.

The composition for an antiglare layer preferably further contains a photopolymerization initiator.

Any photopolymerization initiator may be used.

Examples thereof include the same photopolymerization initiators as those described above for the composition for a low refractive index layer. These photopolymerization initiators may be used alone or in combination of two or more thereof.

The composition for an antiglare layer also preferably contains a photosensitizer. Examples thereof include n-butylamine, triethylamine, and poly-n-butylphosphine.

The amount of the photopolymerization initiator in the composition for an antiglare layer is preferably 0.5 to 10.0 parts by mass relative to 100 parts by mass of the binder resin. When the amount is less than 0.5 parts by mass, the formed antiglare layer may have insufficient hard coat properties. When the amount is more than 10.0 parts by mass, curing is undesirably inhibited.

The raw material content (solid content) of the composition for an antiglare layer is not limited, but is usually 5 to 70% by mass, particularly preferably 25 to 60% by mass.

The composition for an antiglare layer preferably contains a leveling agent.

Examples of the leveling agent include fluorine leveling agents, silicone leveling agents, and silicone- and fluorine atom-containing leveling agents. These leveling agents may be used alone or in combination of two or more thereof. Preferred are, for example, fluorine leveling agents and silicone- and fluorine atom-containing leveling agents.

The composition for an antiglare layer preferably contains a fluorine or silicone leveling agent as the leveling agent.

The composition for an antiglare layer containing a leveling agent suitably prevents the formation of a Bénard cell structure in the antiglare layer. When a resin composition containing a solvent is applied and dried, the coating film has a surface tension difference between the surface and the inside of the coating film. This causes many convection currents in the coating film. The structure formed by this convection is called a Bénard cell structure. The Bénard cell structure causes problems on the formed antiglare layer such as orange peel or defective coating.

The Bénard cell structure causes the antiglare layer to have too large projections and depressions on the surface, leading to low transparency and whitish appearance. The Bénard cell structure also causes adverse effects such as scintillation, a phenomenon in which transmitted light from the inside of a display device is distorted by the projections and depressions of the antiglare layer and seen as glittering in some parts of an image. The use of the leveling agent can prevent the convection, enabling formation of a film having projections and depressions without unevenness or defects and facilitating adjustment of the projections and depressions.

The leveling agent contained in the composition for an antiglare layer may migrate to the composition for a low refractive index layer in application of the composition for a low refractive index layer. If the leveling agent has a problem with compatibility with the composition for a low refractive index layer or with the leveling agent, antifoulant, and the like contained in the composition for a low refractive index layer, the migration may disturb the arrangement of hollow silica and the like contained in the later-described low refractive index layer, which may result in formation of large projections and depressions on the surface of the low refractive index layer.

In such a case, the composition for an antiglare layer preferably contains a non-reactive leveling agent.

The non-reactive leveling agent is less likely to have a problem with compatibility with the later-described composition for a low refractive index layer or with the leveling agent, antifoulant, and the like contained in the composition for a low refractive index layer, and thus allows formation of suitable projections and depressions on the surface of the low refractive index layer.

The non-reactive leveling agent is suitably a lipophilic group-containing oligomer.

The amount of the non-reactive leveling agent is preferably 0.025 to 0.50 parts by mass relative to 100 parts by mass of the binder resin in the antiglare layer.

The non-reactive leveling agent in an amount of less than 0.025 parts by mass may have insufficient leveling power and cause uneven appearance. The non-reactive leveling agent in an amount of more than 0.50 parts by mass causes the coating solution to easily bubble, which may cause defects.

The lower limit of the amount of the non-reactive leveling agent is more preferably 0.050 parts by mass and the upper limit thereof is more preferably 0.20 parts by mass.

Although the composition for an antiglare layer preferably contains only the non-reactive leveling agent as a leveling agent, it may contain other leveling agents to the extent that does not impair the effects of the present invention.

The composition for an antiglare layer may contain conventionally known additives according to the purposes such as an increase in the hardness of the antiglare layer, a reduction of curing shrinkage, and control of the refractive index. Examples of the additives include dispersants, surfactants, antistatic agents, silane coupling agents, thickeners, discoloration inhibitors, colorants (pigments and dyes), defoamers, flame retardants, ultraviolet absorbers, adhesion imparting agents, polymerization inhibitors, antioxidants, surface modifiers, and lubricants.

The composition for an antiglare layer may contain a photosensitizer. Specific examples thereof include n-butylamine, triethylamine, and poly-n-butylphosphine.

The method of preparing the composition for an antiglare layer is not limited as long as the components are homogenously mixed. For example, the composition may be prepared using a known device such as a paint shaker, bead mill, kneader, mixer or the like.

The method of applying the composition for an antiglare layer onto a light-transmitting substrate is not limited, and examples thereof include known methods such as a spin coating method, a dipping method, a spraying method, a die-coating method, a bar-coating method, a roll coating method, a meniscus coating method, a flexo printing method, a screen printing method, and a bead coating method.

After application of the composition for an antiglare layer by any of the above methods, the formed coating film is delivered to a heated zone for drying and dried by a known method, thereby evaporating the solvent. Here, the distribution state of the organic fine particles and the agglomerates of the silica fine particles can be adjusted by appropriately determining the relative evaporation rate of the solvent, solid content concentration, coating liquid temperature, drying temperature, speed of drying wind, drying time, solvent atmosphere concentration of the drying zone, and the like.

In particular, the distribution state of the organic fine particles and the agglomerates of the silica fine particles is easily and preferably adjusted by appropriately determining the drying conditions. Specifically, the drying temperature is preferably 30° C. to 120° C., and the speed of drying wind is preferably 0.2 to 50 m/s. The drying treatment appropriately adjusted within these ranges is conducted once or for multiple times, so that the distribution state of the organic fine particles and the agglomerates of the silica fine particles are adjusted as desired.

The ionizing radiation for curing the dried coating may be performed using a light source such as a ultra-high pressure mercury lamp, a high-pressure mercury lamp, a low-pressure mercury lamp, a carbon-arc lamp, a black light fluorescent lamp, or a metal halide lamp, for example.

The UV light may have a wavelength in a range of 190 to 380 nm. Specific examples of the electron beam source include various electron beam accelerators such as Cockcroft Walton type, Van de graff type, resonance transformer type, insulated core transformer type, linear type, Dainamitoron type, and high-frequency type.

The antiglare layer preferably has a thickness of 2.0 to 15.0 μm. An antiglare layer having a thickness of less than 2.0 μm may be easily scratched at the surface. An antiglare layer having a thickness of more than 15.0 μm may easily break. The thickness of the antiglare layer is more preferably within the range of 2.0 to 7.0 μm. The upper limit is still more preferably 5.0 μm. The thickness of the antiglare layer can be measured by microscopy of a cross section using a SEM or an optical microscope, for example.

The thickness can be calculated as the arithmetic average of the thicknesses measured by the microscopy at any five points free of foreign matter, scratches, and the like.

The optical layered body of the present invention may further appropriately include, as needed, one or two or more function layers (e.g., an antistatic layer, an antifouling layer, an adhesive layer, an antireflection layer, and other hard coat layers) on the surface of the light-transmitting substrate on which the antiglare layer and the low refractive index layer are not stacked, the top surface of the low refractive index layer, or between the light-transmitting substrate and the antiglare layer, to the extent that does not impair the effects of the present invention. In particular, the optical layered body preferably includes at least one of an antistatic layer or an antifouling layer. These layers may be the same as known antireflective laminates.

As mentioned above, the optical layered body of the present invention may include a function layer such as an antifouling layer on the low refractive index layer. The function layer is an ultrathin film that is thin enough not to impair optical characteristics such as scratch resistance and antireflective properties. The ultrathin film has a thickness of, for example, 35 nm or less. The thinner the ultrathin film, the better.

The optical layered body of the present invention essentially includes the low refractive index layer. All the physical properties obtained by the optical layered body of the present invention including the low refractive index layer remain the same even when the ultrathin function layer is stacked on the low refractive index layer.

Thus, the substantial air interface of the optical layered body of the present invention may not be the low refractive index layer.

The optical layered body of the present invention preferably has a total light transmittance of 85% or more. With a total light transmittance of less than 85%, the optical layered body of the present invention has insufficient transparency and may impair color reproducibility and visibility when attached to the surface of an image display device. The total light transmittance is more preferably 90% or more, still more preferably 91% or more.

The total light transmittance can be measured in conformity with JIS K7361 using "HM-150" available from Murakami Color Research Laboratory Co., Ltd., for example.

The optical layered body of the present invention is an antireflective film including a low refractive index layer on an antiglare layer. The presence of the antiglare layer alone can favorably prevent reflection of the surrounding objects. The presence of the low refractive index layer on the antiglare layer improves transparency and provides the effect of making images and letters appear clear. Controlling the luminous reflectance (%) calculated as brightness perceived by human eyes, rather than the mere 5° regular reflectance (%), enables production of a more preferable optical layered body. In the present invention, the luminous reflectance (%) is preferably 3.0% or less, and the lower the luminous reflectance, the better. The luminous reflectance (%) is more preferably 2.0% or less, still more preferably 1.0% or less. It is difficult to achieve a substantially non-reflective optical layered body having, for example, a luminous reflectance of about 0.1% when maintaining physical strength. The optical layered body of the present invention thus preferably has a luminous reflectance (%) of 0.3% to 1.8%, 1.5% or less, most preferably 1.0% or less.

The luminous reflectance (%) may be determined by measuring the 5° regular reflectance in the wavelength range of 380 to 780 nm using, for example, a spectral reflectance measuring device (available from Shimadzu Corporation, product name: UV-2450) and then calculating the luminous reflectance using software (included with the device) that converts the 5° regular reflectance into the brightness perceived by human eyes.

The optical layered body of the present invention preferably has a haze of less than 15%. The antiglare layer may have an internal haze due to internal diffusion caused by contained fine particles and an external haze due to the projections and depression on the surface. The internal faze due to internal diffusion is within a range of preferably 0% or more but less than 10%, more preferably 0% or more but less than 7%, and still more preferably 0% or more but less than 5%. The external haze on the surface is within a range of preferably 0% or more but less than 5%, more preferably 0% or more but less than 3%, and still more preferably 0% or more but less than 1%.

The internal haze is determined as follows.

Onto the projections and depressions on the surface of the low refractive index layer of the optical layered body, a resin having the same or similar (difference of at most 0.02) refractive index as the resin forming the projections and depressions on the surface is applied using a wire bar to a dried thickness of 8 μm (i.e., thickness that completely covers the surface projections and depressions to make the surface flat). The resin is dried at 70° C. for a minute and cured by irradiation with UV light of 100 mJ/cm². Thus obtained film does not have projections and depressions on the surface and is flat. In the case where the composition forming the antiglare layer having projections and depressions contains a leveling agent or the like, the antiglare layer is likely to repel the applied resin and hardly gets wet. In such a case, the surface of the antiglare layer may be hydrophilized by saponification (immersion in a 2 mol/L NaOH (or KOH) solution at 55° C. for three minutes, followed by rinsing, complete removal of water drops using Kimwipes®, and drying in a 50° C. oven for a minute).

The flat film does not have surface projections and depressions and thus has only an internal haze. The haze of this film is similarly measured in conformity with JIS K-7136, whereby the internal haze is obtained.

The external haze is determined by calculating the formula: (Haze)−(Internal haze).

The internal haze also can be simply calculated using, instead of the resin layer, an optical transparent adhesive film including an adhesive layer having a lower refractive index than the resin forming the surface projections and depressions. In this case, the haze of the optical transparent adhesive film may be measured in advance and subtracted from the internal haze.

The optical layered body of the present invention preferably has a contrast ratio of 80% or more, more preferably 90% or more. With a contrast ratio of less than 80%, the optical layered body of the present invention may provide a poor dark-room contrast to lower the visibility when mounted on the surface of a display device. The contrast ratio as used herein is measured by the following method. A cold-cathode tube light source equipped with a diffuser, as a back light unit, and two polarizing plates (AMN-3244TP, available from SAMSUNG) are used. The luminance $L_{max}$ of light passed through the polarizing plates arranged in parallel Nicol is divided by the luminance $L_{min}$ of light passed through the polarizing plates arranged in crossed Nicols to determine a contrast ($L_{max}/L_{min}$). The contrast ($L_1$) of the optical layered body (light-transmitting substrate+ antiglare layer and other layers) is divided by the contrast ($L_2$) of the light-transmitting substrate to determine a contrast ratio ($L_1/L_2$)×100(%).

The luminance is measured in a dark room with a luminance coloriometer (BM-5A, available from Topcon Corp.). The measurement angle of the luminance coloriometer is set to 1° and the field of view on a sample is set to φ5 mm. With respect to the quantity of light from the backlight unit, the backlight unit is set to provide a luminance of 3600 cd/m² when two polarizing plates are arranged in parallel Nicol without a sample.

The lower limit of the 60° gloss value of the optical layered body of the present invention is preferably 100, more preferably 105, still more preferably 110 and the upper limit thereof is preferably 160, more preferably 150. The 60° gloss is a gloss (%) determined in conformity with JIS Z 8741 using, for example, Precision Gloss Meter GM-26PRO (Murakami Color Research Laboratory Co., Ltd.). The sample size is 5 cm×10 cm. In the measurement, the back surface (surface without the antiglare layer) of the sample is brought into close contact with a blackboard by an air suction method.

FIG. 3 explains the gloss measurement method (angles) in conformity with JIS Z 8741.

As shown in FIG. 3, measurement at 60° is intended to determine antiglare properties when the screen is viewed from an oblique angle. Controlling the 60° gloss makes it possible to obtain preferred antiglare properties in a large screen regardless of viewing angle.

The lower limit of the 20° gloss of the optical layered body of the present invention is preferably 70, more preferably 75, still more preferably 80 and the upper limit thereof is preferably 150, more preferably 120, still more preferably 100.

As shown in FIG. 3, measurement at 20° is intended to determine antiglare properties when the screen is viewed from the front (i.e., 20° from the angle orthogonal to the screen). This angle is of particular interest, whether the TV or monitor has a large screen or small screen. It is thus important that preferable antiglare properties are obtained at this angle. Controlling this gloss allows control of the antiglare properties that are preferably provided as a standard. The screen front direction corresponds to the angle range in which the refection of the viewer themselves highly probably occurs. The surface is thus preferably shaped such that the 20° gloss value in the front direction is smaller than the 60° gloss value in an oblique direction. A lower gloss value indicates higher antiglare properties and less reflection. Here, to achieve an optical layered body having excellent antireflective performance and high transparency, the antiglare property proportion (%), that is, the proportion of the 20° gloss in the front direction to the 60° gloss in an oblique direction, is preferably 65% to 95%. An optical layered body having an antiglare property proportion of less than 65% tends to have too strong front antiglare properties and low transparency. An optical layered body having an antiglare property proportion of more than 95%, namely, an optical layered body in which the 20° gloss and the 60° gloss are substantially the same, tends to have too low front antiglare properties and may cause noticeable reflection of the viewer themselves.

The optical layered body of the present invention satisfying both the above preferable range of the 20° gloss and the preferable range of the 60° gloss has excellent antiglare properties.

The optical layered body satisfying all the preferable ranges of the reflectance (luminous reflectance), total light transmittance, 20° gloss, and 60° gloss can provide very good visibility particularly to a display of a 50-inch or larger screen or a video monitor, regardless of viewing angle. Such properties satisfying the preferable ranges are preferred as antiglare properties of the optical layered body of the present invention including the antiglare layer and low refractive index layer. The optical layered body of the present invention has optical characteristics that allows such easy visibility at any angle and has excellent scratch resistance, and thus is very suitable for large-screen digital signage, which have been frequently used in recent years.

In the present invention, the unit (%) of gloss is omitted.

When the optical layered body of the present invention further includes other members such as a cover glass, a film, a polarizing element, or a display element via an adhesive layer or the like on the surface of the light-transmitting substrate opposite to the surface on which the low refractive index layer is stacked, the optical characteristics of the optical layered body, such as gloss, reflectance (luminous reflectance), total light transmittance, haze, contrast ratio, may be measured after pre-treatment such as removal of the adhesive layer and other members or thinning of the adhesive layer and the like as possible.

Meanwhile, the mechanical properties of the optical layered body on the low refractive index layer surface side, such as the nanoindentation hardness, as well as the properties such as particle size of the fine particles in the antiglare layer, can be directly measured without the pre-treatment as long as the low refractive index layer is stacked on the surface of another member.

<Size and Shape>

The optical layered body of the present invention may be in the form of a sheet cut to a predetermined size or in the form of a roll of a long sheet.

The sheet may have any size, but has a maximum size of around 2 to 500 in. The "maximum size" is the maximum length between any two points of the optical layered body. For example, in a rectangular optical layered body, the length of the diagonal of the region is the maximum size. In a circular optical layered body, the diameter is the maximum size.

When the optical layered body of the present invention is in the form of a roll, the long sheet wounded into the roll may have any width and length. Typically, the width is about 300 to 3000 mm and the length is about 50 to 5000 m. The roll form optical layered body of the present invention may be cut into a sheet according to the size of a display device, for example, before use. In cutting, portions with unstable physical properties such as the roll ends are preferably excluded.

The sheet may have any shape such as a polygonal shape (e.g., a triangular, quadrangular, or pentagonal shape), a circular shape, or an irregular shape, for example. More specifically, when the optical layered body of the present invention is quadrangular, the sheet may have any length-to-width ratio that is not problematic for a display screen. For example, the length: width may be 1:1, 3:4, 10:16, 9:16, or 1:2. In in-vehicle applications and digital signage, which have various designs, the length-to-width ratio is not limited to these values.

The optical layered body of the present invention may further include other optical members such as a polarizing element or a retardation film. For example, the optical layered body of the present invention may include the above-described antiglare layer and the like on at least one surface of the light-transmitting substrate, and further include a polarizing element. The polarizing element may have a polarizing element protection film on at least one surface thereof.

When the optical layered body of the present invention includes a polarizing element, the optical layered body may have a layered structure in which the light-transmitting substrate and the antiglare layer and the like are stacked on at least one surface of the polarizing element. Specific examples include: a structure in which the light-transmitting substrate and the antiglare layer and the like are sequentially stacked on one surface of the polarizing element, and the polarizing element protection film is stacked on the other surface; and a structure in which polarizing element protection films are stacked on both surfaces of the polarizing element, and on one of the polarizing element protection films are sequentially stacked the light-transmitting substrate and the antiglare layer and the like. In optical layered bodies with such structures, the surface on the side of the antiglare layer and the like is typically the light emit surface.

The optical layered body including a polarizing element may also be used as a polarizing plate. Such a polarizing plate is encompassed by the present invention.

The present invention also relates to a polarizing plate including: a polarizing element; and the optical layered body of the present invention on a surface of the polarizing element.

Any polarizing element may be used. Examples thereof include polyvinyl alcohol films, polyvinyl formal films, polyvinyl acetal films, and ethylene/vinyl acetate copolymerized saponified films which are each dyed using, for example, iodine and then stretched. The lamination treatment of the polarizing element and the optical layered body of the present invention preferably includes a step of saponifying the light-transmitting substrate (triacetyl cellulose film). The saponification provides good adhesion and antistatic effects.

The optical layered body or polarizing plate of the present invention may be suitably used as a display panel and as an image display device.

The present invention also relates to a display panel including the optical layered body of the present invention or the polarizing plate of the present invention.

The present invention also relates to an image display device including the optical layered body of the present invention or the polarizing plate of the present invention.

The display panel is a member of a display on the viewer side. For example, in a liquid crystal display, the display panel is a member including two glass plates (e.g., a color filter substrate and an array substrate) enclosing a liquid crystal material, a polarizing element and the like (e.g., a polarizing element and a polarizing element protection film), and the optical layered body of the present invention, for example.

Preferably, the optical layered body of the present invention is used as a component of an image display device such as a liquid crystal display device, and disposed such that the top surfaces of the antiglare layer and the like of the optical layered body face the viewer side (light exit surface side of the image display device). Furthermore, the optical layered body of the present invention is preferably disposed on the surface of an image display device such that the top surfaces of the antiglare layer and the like of the optical layered body of the present invention face the viewer side (light exit surface side of the display device).

The optical layered body of the present invention and the polarizing element may be cut into sheets according to the size of a display device before they are bonded to each other, or the members in the form of rolls may be bonded to each other. After the members in the form of rolls are bonded to each other, the bonded members may be cut according to the size of a display device.

When the optical layered body of the present invention is applied to a display device such as a liquid crystal display device, the sheet or roll form optical layered body may be bonded to the later-described display element and then cut according to the size of the display device. In cutting, portions with unstable physical properties such as the roll ends are preferably excluded.

[Image Display Device]

The image display device including the optical layered body of the present invention includes the optical layered body of the present invention or the polarizing plate of the present invention described above. To more effectively achieve the effects of the present invention, the image display device preferably has the optical layered body of the present invention or the polarizing plate of the present invention described above on the viewer side (light exit surface side of the image display device) of a display element such as a liquid crystal display element, a plasma display element, or an organic EL display element. More specifically, preferably, the image display device has the optical layered body of the present invention or the polarizing plate of the present invention described above on the viewer-side surface of a display element such that the top surfaces (surfaces having projections and depressions) of the antiglare layer and the like of the optical layered body or polarizing plate face the viewer side.

The image display device may have any size, but has a maximum size of 2 to 500 in. The "maximum size" is the maximum length between any two points of the optical layered body. For example, in a rectangular image display device, the length of the diagonal of the region is the maximum size. In a circular optical layered body, the diameter is the maximum size.

The image display device may be an image display device such as a LCD, a PDP, a FED, an ELD (organic EL or inorganic EL), a micro LED display, a CRT, a tablet PC, a touch panel, or electric paper.

An LCD, which is a representative example of the image display device, includes a transparent display and a lighting system for irradiating the transparent display from the back. In the case where the image display device of the present invention is an LCD, the image display device has the optical layered body of the present invention or the polarizing plate of the present invention on the surface of the transparent display.

In the case where the present invention relates to a liquid crystal display device including the optical layered body, the optical layered body is irradiated by the light source of the lighting system from its bottom side. A retardation plate may be inserted between a liquid crystal display element and a polarizing plate. The liquid crystal display device may optionally have an adhesive layer between one layer and the next.

A PDP, which is an example of the image display device, has a front glass substrate (with electrodes on the surface) and a back glass substrate (with electrodes and small grooves on the surface, the grooves having red, green, and blue fluorescent layers therein) facing the front glass substrate, with discharge gas enclosed between the substrates. In the case where the image display device of the present invention is a PDP, the display device has the above optical layered body on the surface of the front glass substrate or the front plate (glass substrate or film substrate) of the front glass substrate.

The image display device may be another image display device such as an ELD device configured to provide display by controlling the voltage applied to the glass substrate where zinc sulfide or a diamine substance which emits light under voltage, i.e., a light-emitting material, is deposited; or a CRT configured to convert electric signals into light and produce images visible to human eyes. In this case, the display devices each have the above optical layered body on the surface or on the surface of the front plate.

In any of the above cases, the image display device of the present invention can be used for display on televisions, computers, electronic paper, touch panels, or tablet PCs, for example. In particular, the optical layered body of the present invention can be suitably used on the surface of high definition image displays, such as CRTs, liquid crystal panels, PDPs, ELDs, FEDs, and touch panels. The optical layered body of the present invention can also be suitably used on the image display surface of foldable, bendable, or rollable image display devices and touch panels.

Advantageous Effects of Invention

The optical layered body of the present invention has the above structure, and thus has excellent scratch resistance. The optical layered body also has suitable antiglare properties and excellent transparency.

The optical layered body of the present invention thus can be suitably used on the surface of high definition image displays, such as cathode ray tube (CRT) displays, liquid crystal displays (LCDs), plasma displays (PDPs), electroluminescence displays (organic or inorganic ELDs), micro LED displays, field emission displays (FEDs), touch panels, and electric paper. The optical layered body of the present invention can also be suitably used on the image display surface of foldable, bendable, or rollable image display devices and touch panels.

BRIEF DESCRIPTION OF DRAWINGS

FIG. 1(a) is a schematic view illustrating indentation of a sample with an indenter and unloading of the indenter. FIG. 1(b) is a graph showing an exemplary indentation load-indentation depth curve.

DESCRIPTION OF EMBODIMENTS

Figure 1:
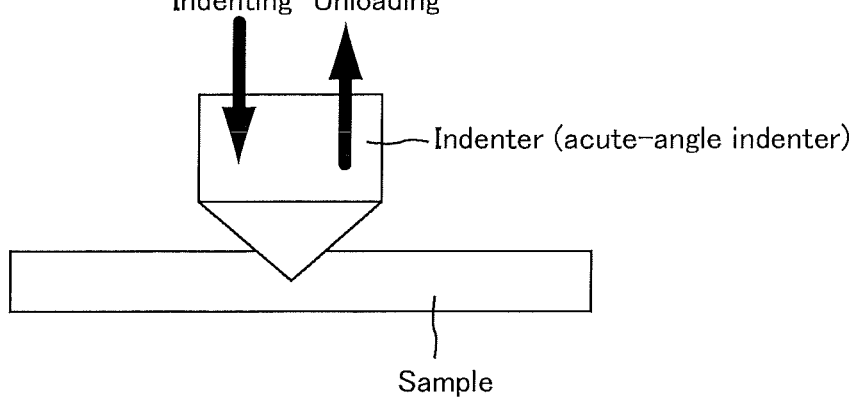
FIG. 1 explains a nanoindentation method.
Figure 1:
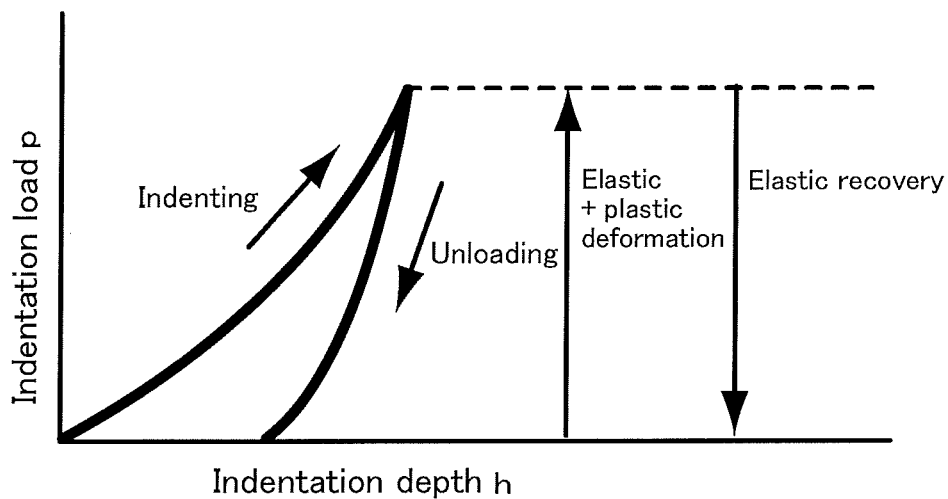
Figure 2:
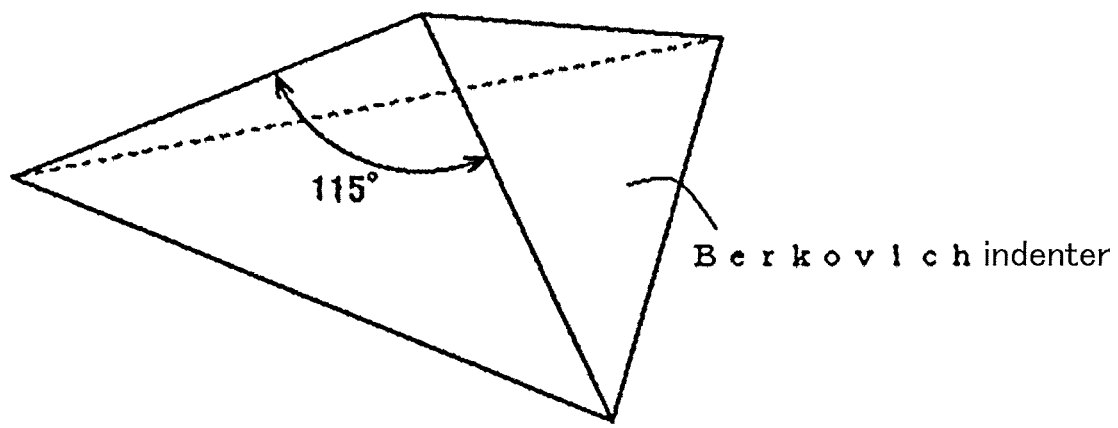
FIG. 2 is a schematic view of an exemplary Berkovich indenter.
Figure 3:
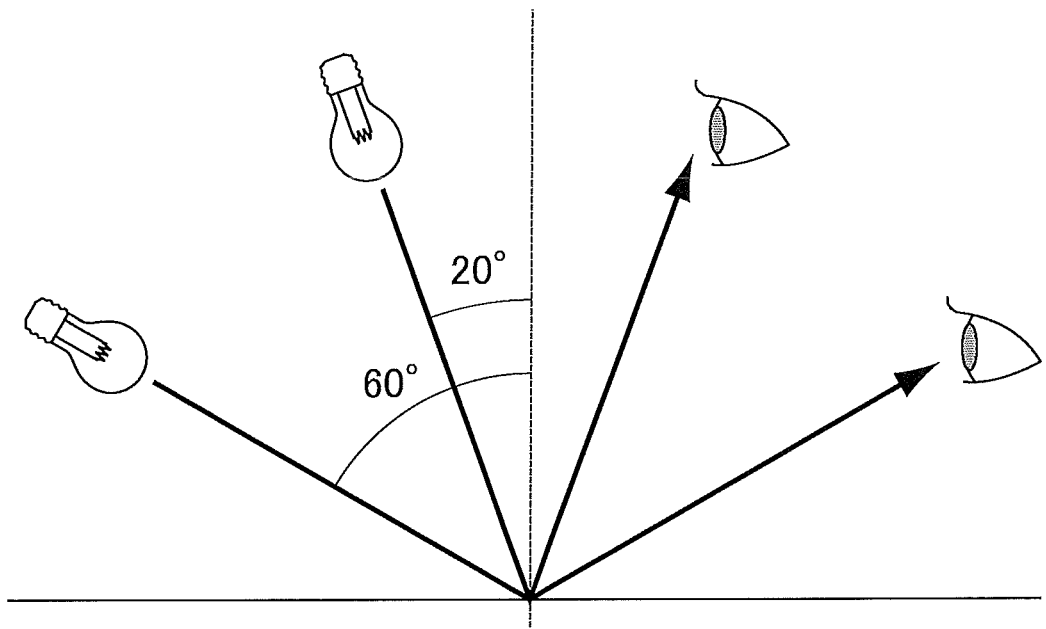
FIG. 3 explains a gloss measurement method (angles) in conformity with JIS Z 8741.

The present invention is described with reference to the examples below. The embodiments, however, are not intended to limit the scope of the present invention. Unless otherwise specified, the expressions "part(s)" and "%" are based on mass.

The optical layered bodies according to examples and comparative examples were produced and subjected to measurements of physical properties and evaluations as follows. Table 1 and Table 2 show the results. All the measurements and evaluations used non-wrinkled, clean portions of samples. Measurement samples were prepared not from the ends of productions samples, but from portions at or near the center that were presumably formed of relatively stable coating film.

<The Optical Layered Body of the First Aspect of the Present Invention>

Example 1

A light-transmitting substrate (thickness: 40 µm, triacetylcellulose resin film, product name: TD40UC, available from Fujifilm Corporation) was provided. To one surface of the light-transmitting substrate was applied a composition for an antiglare layer having the formulation below, whereby a coating film was formed.

The formed coating film was then dried by flow of dry air at 70° C. at a rate of 0.2 m/s for 15 seconds and then at a rate of 10 m/s for 30 seconds to evaporate the solvent in the coating film. The coating film was then cured by UV irradiation at an accumulated light amount of 30 mJ/cm$^2$, whereby an antiglare layer having a thickness (cured) of 5 µm was formed.

(Composition for Antiglare Layer)

Tetrafunctional acrylate monomer (product name: SR295, available from Sartomer Co., Inc.) 50 parts by mass Urethane acrylate oligomer (product name: UV1700B, available from The Nippon Synthetic Chemical Industry Co., Ltd.) 50 parts by mass IRGACURE 184 (available from BASF Japan Ltd.) 3 parts by mass Non-reactive fluorine leveling agent (product name: F554, available from DIC Corporation) 0.1 parts by mass Organic fine particles (average particle size: 2.0 μm, spherical polyacrylic-styrene copolymer, available from. Sekisui Plastics Co., Ltd.) 3 parts by mass Fumed silica (octylsilane-treated, average particle size 12 nm, available from Nippon Aerosil. Co., Ltd.) 1 part by mass Methyl isobutyl ketone 160 parts by mass Isopropyl alcohol 40 parts by mass Subsequently, to the surface of the formed antiglare layer was applied a composition for a low refractive index layer having the formulation below to a thickness after drying (40° C.×1 min) of 0.11 μm. The applied composition was cured into a low refractive index layer by UV irradiation at an accumulated light amount of 100 mJ/cm$^2$ using a UV irradiator (available from Fusion UV Systems Japan K.K., light source H valve) in a nitrogen atmosphere (oxygen concentration of 200 ppm or less). Thus, an optical layered body according to Example 1 was produced.

(Composition for Low Refractive Index Layer)

Trifunctional acrylate monomer (product name: SR444, available from Sartomer Co., Inc.) 100 parts by mass Hollow silica fine particles (average particle size: 50 nm, available from JGC Catalysts and Chemicals Ltd.) 180 parts by mass Solid silica fine particles (average particle size: 12 nm, available from Nissan Chemical Corporation) 60 parts by mass IRGACURE 184 (available from BASF Japan Ltd.) 10 parts by mass Reactive fluorine leveling agent (RS-78, available from DIC Corporation) 8 parts by mass Methyl isobutyl ketone 10000 parts by mass Example 2

A composition for a low refractive index layer was prepared as in Example 1 except that the amount of solid silica fine particles added was changed to 20 parts by mass. An optical layered body according to Example 2 was produced as in Example 1 except that the composition for a low refractive index layer was used.

Example 3

A composition for a low refractive index layer was prepared as in Example 1 except that the amount of solid silica fine particles added was changed to 100 parts by mass. An optical layered body according to Example 3 was produced as in Example 1 except that the composition for a low refractive index layer was used.

Example 4

A composition for a low refractive index layer was prepared as in Example 1 except that no solid silica fine particles were added. An optical layered body according to Example 4 was produced as in Example 1 except that the composition for a low refractive index layer was used.

Example 5

A composition for an antiglare layer was prepared as in Example 4 except that the non-reactive fluorine leveling agent (product name: F554, available from DIC Corporation) was replaced with 0.1 parts by mass of a non-reactive fluorine leveling agent (F551, available from DIC Corporation). An optical layered body according to Example 5 was produced as in Example 4 except that the composition for an antiglare layer was used.

Example 6

A composition for a low refractive index layer was prepared as in Example 1 except that the amount of solid silica fine particles added was changed to 110 parts by mass. An optical layered body according to Example 6 was produced as in Example 1 except that the composition for a low refractive index layer was used.

Example 7

A composition for a low refractive index layer was prepared as in Example 1 except that the amount of solid silica fine particles added was changed to 80 parts by mass. An optical layered body according to Example 7 was produced as in Example 1 except that the composition for a low refractive index layer was used.

Example 8

A composition for a low refractive index layer was prepared as in Example 7 except that the trifunctional acrylate monomer was changed to a bifunctional acrylate monomer (product name: M240, available from Toagosei Co., Ltd.). An optical layered body according to Example 8 was produced as in Example 1 except that the composition for a low refractive index layer was used.

Example 9

A composition for a low refractive index layer was prepared as in Example 7 except that the trifunctional acrylate monomer was changed to a hexafunctional acrylate monomer (product name: DPHA, available from Sartomer Co., Inc.). An optical layered body according to Example 9 was produced as in Example 1 except that the composition for a low refractive index layer was used.

Example 10

A composition for a low refractive index layer was prepared as in Example 1 except that the reactive fluorine leveling agent (RS-78, available from DIC Corporation) was replaced with a silicone- and fluorine atom-containing additive (KY-1203, available from Shin-Etsu Chemical Co., Ltd.). An optical layered body according to Example 10 was produced as in Example 1 except that the composition for a low refractive index layer was used.

Example 11

A composition for a low refractive index layer was prepared as in Example 1 except that the reactive fluorine leveling agent (RS-78, available from DIC Corporation) was replaced with a silicone leveling agent (KP-611, available from Shin-Etsu Chemical Co., Ltd.) An optical layered body according to Example 11 was produced as in Example 1 except that the composition for a low refractive index layer was used.

Comparative Example 1

A composition for an antiglare layer was prepared as in Example 4 except that the non-reactive fluorine leveling agent (product name: F554, available from DIC Corporation) was replaced with 0.1 parts by mass of a silicone leveling agent (TSF4460, available from Momentive Performance Materials Inc.). An optical layered body according to Comparative Example 1 was produced as in Example 4 except that the composition for an antiglare layer was used.

Comparative Example 2

A composition for a low refractive index layer was prepared as in Comparative Example 1 except that the trifunctional acrylate monomer (product name: SR444, available from Sartomer Co., Inc.) was replaced with 100 parts by mass of a bifunctional acrylate monomer (product name: SR238F, available from Sartomer Co., Inc.) An optical layered body according to Comparative Example 2 was produced as in Comparative Example 1 except that the composition for a low refractive index layer was used.

(Measurement of Arithmetic Average Roughness (Ra) and Ten-Point Average Roughness (Rz) of Surface of Low Refractive Index Layer)

The Ra and Rz were measured and calculated using an AFM (SPM-9600, available from Shimadzu Corporation) under the following conditions.

The definitions of the surface roughness parameters obtained by the AFM are as specified in JIS B0031 (1994). The AFM can calculate the parameters as the surface averages in the scan range (area of the field of view) with software included with SPM-9600.

The AFM measurement excluded portions where defects such as specific falling or projections and depressions were observed.

Cantilever: NCH-W (NanoWorld AG)
Scan range: 5 μm (area of the field of view 5 μm×5 μm)
Scan speed: 1 Hz
Analysis software: SPM manager Version 4.36.10

<Preparation of Measurement Sample>
The measurement sample was prepared by steps (1) to (4) below.
(1) Carbon tape was attached to a sample stage and the release paper was removed with tweezers.
(2) A sample was held at its end with tweezers, and cut with scissors to 8 mm×8 mm to prepare a sample smaller than the carbon tape.
(3) Air was blown to the front and back of the sample using a blower to remove foreign matter.
(4) With the front (measurement surface) of the sample facing up, the carbon tape was attached to the back of the sample, whereby a measurement sample was prepared.

<Arithmetic Average Roughness Ra>
The arithmetic average roughness Ra was determined by the following process in conformity with JIS B0031 (1994): A portion stretching over a reference length (l) in the direction in which the average line extends is cut out from the roughness curve of the surface of the obtained measurement sample. The Ra is calculated by the equation below when the roughness curve is expressed by y=f(x) with the X axis extending in the same direction as the average line in the portion and the Y axis in the direction of the vertical magnification in the portion. The obtained value is expressed in micrometers (μm).

$$Ra = \frac{1}{l}\int_0^l |f(x)|dx \qquad \text{[Math. 5]}$$

<Ten-Point Average Roughness Rz>
The ten-point average roughness Rz is determined as follows in conformity with JIS B0031 (1994): A portion stretching over a reference length (l) in the direction in which the average line extends is cut out from the roughness curve of the surface of the obtained measurement sample. The levels (Yp) of the highest to fifth highest peaks and the levels (Yv) of the lowest to fifth lowest troughs in this portion are measured in the direction of the vertical magnification from the average line. The Rz is the sum of the average of the absolute values of the levels (Yp) and the average of the absolute values of the levels (Yv) calculated by the equation below. The obtained value is expressed in micrometers (μm).

$$Rz = \frac{|Yp_1 + Yp_2 + Yp_3 + Yp_4 + Yp_5| + |Yv_1 + Yv_2 + Yv_3 + Yv_4 + Yv_5|}{5} \qquad \text{[Math. 6]}$$

In the equation, $Yp_1$, $Yp_2$, $Yp_3$, $Yp_4$, and $Yp_5$ are the levels of the highest to fifth highest peaks in the cut out portion over the reference length (l).

$Yv_1$, $Yv_2$, $Yv_3$, $Yv_4$, and $Yv_5$ are the levels of the lowest to fifth lowest troughs in the cut out portion over the reference length (l).

(Hardness of Surface of Low Refractive Index Layer: Nanoindentation Hardness (MPa) Measurement)

The hardness was measured using "TI950 TriboIndenter" available from HYSITRON in the displacement control mode under the following conditions. The low refractive index layer was indented to 30 nm with a Berkovich indenter (triangular pyramid, diamond-made, angle between edges) 115° at a loading rate of 10 nm/s. After holding for a certain period of time to relax residual stress, the indenter was unloaded, whereby a load-displacement curve was obtained. The indentation hardness was then automatically calculated by the device.

Calculation was conducted as follows: From the unloading curve, the depth of contact of the sample with the indenter (contact depth) was calculated. From the contact depth was determined a contact projected area (A ($nm^2$)). Using this area and the maximum load (Pmax (μN)) after relaxation, the indentation hardness was automatically calculated according to Pmax/A. To obtain stable measurement results, the sample surface was observed with a microscope at 50 to 500 times magnification.

Portions having extremely projected or extremely depressed structures were avoided, and a portion as smooth as possible and free of specific defects was selected for the measurement.

<Preparation of Sample>
The optical layered body was cut to 20 mm×20 mm and fixed to a commercially available glass slide via an adhesive resin (product name "Aron Alpha® General-purpose type", available from Toagosei Co., Ltd.) with the low refractive index layer side facing up. Specifically, the adhesive resin was deposited dropwise on the center of glass slide 1 (product name "Glass slide (untreated edges) 1-9645-11", available from As One Corporation). At this time, the adhesive resin was not spread out, and one droplet was deposited so that the adhesive resin would not spill out from the optical layered body when the adhesive resin is pressed as described later.

The cut optical layered body was then brought into contact with the glass slide such that the low refractive index layer side faced up and the adhesive resin was positioned at the center of the optical layered body. The adhesive resin was pressed between the glass slide 1 and the optical layered body, whereby the glass slide 1 and the optical layered body were temporarily bonded.

Another new glass slide 2 was then placed on the optical layered body to prepare a glass slide 1/adhesive resin/optical layered body/glass slide 2 layered body.

Subsequently, on the glass slide 2 was placed a weight of at least 30 g but not more than 50 g. The layered body was left to stand at this state for 12 hours at room temperature. The weight and glass slide 2 were then removed, whereby a measurement sample was obtained.

The measurement sample was fixed to a measurement stage of "TI950 TriboIndenter" available from HYSITRON placed in parallel with a vibration isolation table.

The indentation hardness was obtained as the arithmetic average of hardnesses measured at randomly selected five points at or near the center (region in which the adhesive resin existed) of the surface of the low refractive index layer of the measurement sample.

The five measurement points were randomly selected by observing the low refractive index layer with a microscope at 50 to 500 times magnification. The points were selected from a portion as smooth as possible, avoiding extremely projected or extremely depressed structures.

Indenter: Berkovich indenter (triangular pyramid, diamond-made, angle between edges 115°)
Measurement conditions: displacement control mode
Displacement control mode maximum displacement: 30 nm
Time to reach maximum displacement: 3 seconds
Retention time at maximum displacement: 5 seconds
Unloading time at maximum displacement: 3 seconds
Test point number: five points
Measurement temperature: 25° C.
Measurement humidity: 50%

(Scratch Resistance Test)

A scratch resistance test was performed using a steel wool tester (Model SJTR-053, available from SAM JEE TECH) under the following conditions.
[Preparation of Steel Wool]
Steel wool was cut to a square shape (7 cm×7 cm).
The steel wool was fixed with a zip tie such that the steel wool fit in the lower of the two indentations of the steel wool test head. The steel wool was attached such that there was no crease or slack, and the test direction of the steel wool was perpendicular to the fiber direction of the steel wool.
[Horizontality Check]
The stopper was loosened to let the head move freely up and down. The head without a weight was lowered by setting "CYLINDER" to "DOWN", and whether the head was horizontal was checked.
[Steel Wool Smoothing]
A smoothing treatment was performed to smooth the napped surface of the steel wool.
<Smoothing conditions>weight 500 g, test speed 100 mm/s, 200 reciprocations
[Setting of Specimen]
Sample size: short side 3 cm, long side 25 cm
Dust on the cut specimen or the stage was gently wiped off with waste cloth or the like.
The specimen was set on the stage such that there was no slack, with the coated surface facing up.
[Test]
Specified load 700 g/cm$^2$, Test speed 100 mm/s
Test temperature: 25° C., Test humidity: 50%
[Evaluation]
After the test, black vinyl tape (Yamato Vinyl Tape No200-38-21, 38 mm wide) was attached, and the specimen was examined for the presence or absence of scratches and discoloration under a three-wavelength fluorescent lamp (1300-1700 lux).

The light source-specimen angle and the specimen-tester angle were approximately 45°, and the tester evaluated the specimen at an angle at which scratches and discoloration were particularly easily visible. The turnaround portions (3 cm from each end), which are easily scratched, were ignored.

The surface of the low refractive index layer was then visually examined for the presence or absence of scratches and evaluated according to the following criteria.

Excellent: No scratch or discoloration was observed.
Good: Slight discoloration was observed.
Fair: Slight scratches and slight discoloration were observed.
Poor: Scratches or discoloration were clearly observed.

(Measurement of 5° Regular Reflectance)

Black vinyl tape (Yamato Vinyl Tape No200-38-21, 38 mm wide) was attached to the side opposite to the measurement side of the layered optical layered body, namely, the side on which the low refractive index layer was formed. The 5° regular reflectance (%) of the surface of the optical layered body was measured using an ultra violet-visible spectrophotometer (UV-2450, available from Shimadzu Corporation) in a wavelength range of 380 to 780 nm.

(Reflectance: Luminous Reflectance Measurement)

The reflectance (%) was determined as luminous reflectance. The luminous reflectance was calculated by software (included with the device) that converted the data of the measured 5° regular reflectance (%) into brightness perceived by human eyes.

For each sample, the average of reflectances measured at five points was taken as the results of the reflectance (%) (luminous reflectance) measurement (Table 1).

TABLE 1

|  | Leveling agent contained in composition for antiglare layer | Solid silica fine particles (parts by mass) | Ra (nm) | Rz (nm) | Indentation hardness (Mpa) | Scratch resistance | Reflectance |
| --- | --- | --- | --- | --- | --- | --- | --- |
| Example 1 | Fluorine leveling agent | 60 | 2.0 | 25.4 | 560 | Excellent | 1.31 |
| Example 2 | Fluorine leveling agent | 20 | 1.2 | 13.2 | 525 | Excellent | 1.28 |
| Example 3 | Fluorine leveling agent | 100 | 3.4 | 44.2 | 600 | Fair | 1.33 |

TABLE 1-continued

|  | Leveling agent contained in composition for antiglare layer | Solid silica fine particles (parts by mass) | Ra (nm) | Rz (nm) | Indentation hardness (Mpa) | Scratch resistance | Reflectance |
|---|---|---|---|---|---|---|---|
| Example 4 | Fluorine leveling agent | None | 1.1 | 11.1 | 470 | Good | 1.31 |
| Example 5 | Fluorine leveling agent | None | 1.5 | 20.5 | 497 | Good | 1.30 |
| Example 6 | Fluorine leveling agent | 110 | 4.0 | 59.7 | 610 | Fair | 1.34 |
| Example 7 | Fluorine leveling agent | 80 | 2.3 | 41.6 | 581 | Good | 1.33 |
| Example 8 | Fluorine leveling agent | 80 | 2.4 | 43.1 | 450 | Fair | 1.33 |
| Example 9 | Fluorine leveling agent | 80 | 2.2 | 39.0 | 605 | Excellent | 1.33 |
| Example 10 | Silicone- and fluorine atom-containing leveling agent | 60 | 2.2 | 28.2 | 570 | Good | 1.32 |
| Example 11 | Silicone leveling agent | 60 | 2.8 | 35.5 | 582 | Good | 1.31 |
| Comparative Example 1 | Silicone leveling agent | None | 4.9 | 64.0 | 450 | Poor | 1.31 |
| Comparative Example 2 | Silicone leveling agent | None | 4.7 | 68.0 | 410 | Poor | 1.30 |

The optical layered bodies according to the examples had a Ra of the projections and depressions of 4 nm or less and a Rz of the projections and depressions of 60 nm or less in any 5-μm square region of the surface of the low refractive index layer. These optical layered bodies had both excellent scratch resistance and excellent antireflective performance.

In particular, scratch resistance was excellent in Examples 4 and 5, in which the optical layered bodies had a Ra of 2.0 nm or less and a Rz of 25 nm or less in a microscopic field of view and an indentation hardness of 440 MPa or more, and in Example 7, in which the optical layered body had a Ra of 3.0 nm or less and a Rz of 45 nm or less in a microscopic field of view and an indentation hardness of 500 MPa or more.

In particular, very high scratch resistance was obtained in Examples 1 and 2, in which the optical layered bodies had a Ra of 2.0 nm or less and a Rz of 35 nm or less in a microscopic field of view and an indentation hardness of 500 MPa or more, and in Example 9, in which the optical layered body had a Ra of 3.0 nm or less and a Rz of 45 nm or less in a microscopic field of view and an indentation hardness of 600 MPa or more.

In contrast, the optical layered bodies according to the comparative examples had Ra and Rz of the projections and depressions out of specific ranges in any 5-μm square region of the surface of the low refractive index layer. None of these optical layered bodies achieved both of excellent scratch resistance and excellent antireflective performance.

All the optical layered bodies according to the examples of the first aspect of the present invention had a total light transmittance of 90% or more as measured in conformity with JIS K7361 using "HM-150" available from Murakami Color Research Laboratory Co., Ltd. The optical layered bodies also had a 20° gloss value within the range of 80 to 140 and a 60° gloss value within the range of 110 to 160 as measured in conformity with JIS Z 8741 using Precision Gloss Meter GM-26PRO (Murakami Color Research Laboratory Co., Ltd.). The 20° gloss value/60° gloss value×100 (%) was 70 to 90(%).

The samples for gloss measurement had a size of 5 cm×10 cm. The measurement was performed three times with the back surface of the sample being brought into close contact with a black board by an air suction method. The average of the three measurements was taken as the measured value.

<The Optical Layered Body of the Second Aspect of the Present Invention>

Example 12

A light-transmitting substrate (thickness: 40 μm, triacetylcellulose resin film, product name: TD40UC, available from Fujifilm Corporation) was provided. To one surface of the light-transmitting substrate was applied a composition for an antiglare layer having the formulation below, whereby a coating film was formed.

The formed coating film was then dried by flow of dry air at 70° C. at a rate of 0.2 m/s for 15 seconds and then at a rate of 10 m/s for 30 seconds to evaporate the solvent in the coating film. The coating film was then cured by UV irradiation at an accumulated light amount of 30 mJ/cm$^2$, whereby an antiglare layer having a thickness (cured) of 5 μm was formed.

(Composition for Antiglare Layer)

Tetrafunctional acrylate monomer (product name: SR295, available from Sartomer Co., Inc.) 50 parts by mass Urethane acrylate oligomer (product name: UV1700B, available from The Nippon Synthetic Chemical Industry Co., Ltd.) 50 parts by mass IRGACURE 184 (available from BASF Japan Ltd.) 3 parts by mass Non-reactive fluorine leveling agent (product name: F554, available from DIC Corporation) 0.1 parts by mass Organic fine particles (average particle size: 2.0 μm, spherical polyacrylic-styrene copolymer, available from Sekisui Plastics Co., Ltd.) 3 parts by mass Fumed silica (octylsilane-treated, average primary particle size 12 nm, available from Nippon Aerosil. Co., Ltd.) 1 part by mass Methyl isobutyl ketone 160 parts by mass Isopropyl alcohol 40 parts by mass Subsequently, to the surface of the formed antiglare layer was applied a composition for a low refractive index layer having the formulation below to a thickness after drying (40° C.×1 min) of 0.11 μm. The applied composition was cured into a low refractive index layer by UV irradiation at an accumulated light amount of 100 mJ/cm$^2$ using a UV irradiator (available from Fusion UV Systems Japan K.K., light source H valve) in a nitrogen atmosphere (oxygen concentration of 200 ppm or less). Thus, an optical layered body according to Example 10 was produced.

(Composition for Low Refractive Index Layer)

Trifunctional acrylate monomer (product name: SR444, available from Sartomer Co., Inc.) 100 parts by mass Hollow silica fine particles (average primary particle size: 50 nm, product name: THRULYA DAS, available from JGC Catalysts and Chemicals Ltd.) 180 parts by mass Solid silica fine particles (average primary particle size: 12 nm, product name: MIBK-AC-2140Z, available from Nissan Chemical Corporation) 10 parts by mass IRGACURE 184 (available from BASF Japan Ltd.) 10 parts by mass Reactive silicone leveling agent (RS-57, available from DIC Corporation) 3 parts by mass Methyl isobutyl ketone 10000 parts by mass Example 13

A composition for a low refractive index layer was prepared as in Example 10 except that no solid silica fine particles were added. An optical layered body according to Example 13 was produced as in Example 12 except that the composition for a low refractive index layer was used.

Example 14

A composition for a low refractive index layer was prepared as in Example 1 except that the reactive silicone leveling agent (RS-57, available from DIC Corporation) was replaced with a reactive fluorine leveling agent (RS-71, available from DIC Corporation). An optical layered body according to Example 14 was produced as in Example 12 except that the composition for a low refractive index layer was used.

Example 15

A composition for an antiglare layer was prepared as in Example 12 except that the amount of the urethane acrylate oligomer added was changed to 100 parts by mass. An optical layered body according to Example 13 was produced as in Example 15 except that the composition for an antiglare layer was used.

Example 16

A composition for a low refractive index layer was prepared as in Example 12 except that the trifunctional acrylate monomer was replaced with a hexaacrylate monomer (product name: DPHA, available from Sartomer Co., Inc.). An optical layered body according to Example 16 was prepared as in Example 12 except that the composition for a low refractive index layer was used.

Comparative Example 3

A composition for a low refractive index layer was prepared as in Example 12 except that instead of 10000 parts by mass of methyl isobutyl ketone, a methyl isobutyl ketone/methyl ethyl ketone solvent (5000 parts by mass/5000 parts by mass) was added. An optical layered body according to Comparative Example 3 was prepared as in Example 12 except that the composition for a low refractive index layer was used.

Comparative Example 4

A composition for a low refractive index layer was prepared as in Example 12 except that the amount of solid silica fine particles added was changed to 60 parts by mass. An optical layered body according to Comparative Example 4 was prepared as in Example 12 except that the composition for a low refractive index layer was used.

(Measurement of Arithmetic Average Roughness (Ra) and Ten-Point Average Roughness (Rz) of Surface of Low Refractive Index Layer)

The Ra and Rz were measured and calculated using an AFM (SPM-9600, available from Shimadzu Corporation) under the following conditions.

The definitions of the surface roughness parameters obtained by the AFM are as specified in JIS B0031 (1994). The AFM can calculate the parameters as the surface averages in the scan range (area of the field of view) with software included with SPM-9600.

The AFM measurement excluded portions where defects such as specific falling or projections and depressions were observed.

Cantilever: NCH-W (NanoWorld AG)
Scan range: 5 μm (area of the field of view 5 μm×5 μm)
Scan speed: 1 Hz
Analysis software: SPM manager Version 4.36.10

<Preparation of Measurement Sample>

The measurement sample was prepared by steps (1) to (4) below.

(1) Carbon tape was attached to a sample stage and the release paper was removed with tweezers.
(2) A sample was held at its end with tweezers, and cut with scissors to 8 mm×8 mm to prepare a sample smaller than the carbon tape.
(3) Air was blown to the front and back of the sample using a blower to remove foreign matter.
(4) With the front (measurement surface) of the sample facing up, the carbon tape was attached to the back of the sample, whereby a measurement sample was prepared.

<Arithmetic Average Roughness Ra>

The arithmetic average roughness Ra was determined by the following process in conformity with JIS B0031 (1994): A portion stretching over a reference length (l) in the direction in which the average line extends is cut out from the roughness curve of the surface of the obtained measurement sample. The Ra is calculated by the equation below when the roughness curve is expressed by y=f(x) with the X axis extending in the same direction as the average line in the portion and the Y axis in the direction of the vertical magnification in the portion. The obtained value is expressed in micrometers (μm).

$$Ra = \frac{1}{\ell} \int_0^{\ell} |f(x)| dx \qquad [\text{Math. 7}]$$

<Ten-Point Average Roughness Rz>

The ten-point average roughness Rz is determined as follows in conformity with JIS B0031 (1994): A portion stretching over a reference length (l) in the direction in which the average line extends is cut out from the roughness curve of the surface of the obtained measurement sample. The levels (Yp) of the highest to fifth highest peaks and the levels (Yv) of the lowest to fifth lowest troughs in this portion are measured in the direction of the vertical magnification from the average line. The Rz is the sum of the average of the absolute values of the levels (Yp) and the average of the absolute values of the levels (Yv) calculated by the equation below. The obtained value is expressed in micrometers (μm).

$$Rz = \frac{|Yp_1 + Yp_2 + Yp_3 + Yp_4 + Yp_5| + |Yv_1 + Yv_2 + Yv_3 + Yv_4 + Yv_5|}{5} \qquad [\text{Math. 8}]$$

In the equation, $Yp_1$, $Yp_2$, $Yp_3$, $Yp_4$, and $Yp_5$ are the levels of the highest to fifth highest peaks in the cut out portion over the reference length (l).

$Yv_1$, $Yv_2$, $Yv_3$, $Yv_4$, and $Yv_5$ are the levels of the lowest to fifth lowest troughs in the cut out portion over the reference length (l).

(Hardness of Surface of Low Refractive Index Layer: Indentation Hardness (MPa) Measurement)

The hardness was measured using "TI950 TriboIndenter" available from HYSITRON in the displacement control mode under the following conditions. The low refractive index layer was indented to 30 nm or 300 nm with a Berkovich indenter (triangular pyramid, diamond-made, angle between edges) 115° at a loading rate of 10 nm/s. After holding for a certain period of time to relax residual stress, the indenter was unloaded, whereby a load-displacement curve was obtained. The indentation hardness was then automatically calculated by the device.

Calculation was conducted as follows: From the unloading curve, the depth of contact of the sample with the indenter (contact depth) was calculated. From the contact depth was determined a contact projected area (A ($nm^2$)). Using this area and the maximum load (Pmax (μN)) after relaxation, the indentation hardness was automatically calculated according to Pmax/A.

To obtain stable measurement results, the sample surface was observed with a microscope at 50 to 500 times magnification. Portions having extremely projected or extremely depressed structures were avoided, and a portion as smooth as possible and free of specific defects was selected for the measurement.

<Preparation of Sample>

The optical layered body was cut to 20 mm×20 mm and fixed to a commercially available glass slide via an adhesive resin (product name "Aron Alpha® General-purpose type", available from Toagosei Co., Ltd.) with the low refractive index layer side facing up. Specifically, the adhesive resin was deposited dropwise on the center of glass slide 1 (product name "Glass slide (untreated edges) 1-9645-11", available from As One Corporation). At this time, the adhesive resin was not spread out, and one droplet was deposited so that the adhesive resin does not spill out from the optical layered body when the adhesive resin is pressed as described later.

The cut optical layered body was then brought into contact with the glass slide such that the low refractive index layer side faced up and the adhesive resin was positioned at the center of the optical layered body. The adhesive resin was pressed between the glass slide 1 and the optical layered body, whereby the glass slide 1 and the optical layered body were temporarily bonded.

Another new glass slide 2 was then placed on the optical layered body to prepare a glass slide 1/adhesive resin/optical layered body/glass slide 2 layered body.

Subsequently, on the glass slide 2 was placed a weight of at least 30 g but not more than 50 g. The layered body was left to stand at this state for 12 hours at room temperature. The weight and glass slide 2 were then removed, whereby a measurement sample was obtained.

The measurement sample was fixed to a measurement stage of "TI950 TriboIndenter" available from HYSITRON placed in parallel with a vibration isolation table.

The indentation hardness was obtained as the arithmetic average of hardnesses measured at randomly selected five points at or near the center (region in which the adhesive resin existed) of the surface of the low refractive index layer of the measurement sample.

The five measurement points were randomly selected by observing the low refractive index layer with a microscope at 50 to 500 times magnification. The points were selected from a portion as smooth as possible, avoiding extremely projected or extremely depressed structures.

<Indentation Hardness Measurement at 30 nm Penetration>

The hardness at an indenter penetration of 30 nm was measured under the following conditions.
  Indenter: Berkovich indenter (triangular pyramid)
  Measurement conditions: displacement control mode
  Displacement control mode maximum displacement: 30 nm
  Time to reach maximum displacement: 3 seconds
  Retention time at maximum displacement: 5 seconds
  Unloading time at maximum displacement: 3 seconds
  Test point number: five points
  Measurement temperature: 25° C.
  Measurement relative humidity: 50%

<Indentation Hardness Measurement at 300 nm Penetration>

The hardness at an indenter penetration of 300 nm was measured under the following conditions.
  Indenter: Berkovich indenter (triangular pyramid)
  Measurement conditions: displacement control mode
  Displacement control mode maximum displacement: 300 nm
  Time to reach maximum displacement: 30 seconds
  Retention time at maximum displacement: 5 seconds
  Unloading time at maximum displacement: 30 seconds
  Test point number: five points
  Measurement temperature: 25° C.
  Measurement relative humidity: 50%

(Measurement of Water Contact Angle)

The pure water contact angle was measured using a solid/liquid interface analyzer "Drop Master 300" available from Kyowa Interface Science Co., Ltd.

Pure water (1.0 μL) was dropped onto the surface of the low refractive index layer of the optical layered body. One second after the landing of the droplet, the contact angle was calculated by the θ/2 method from the angle of a straight line connecting the left or right end of the droplet and the vertex of the droplet with respect to the solid surface. The average of five measurements was taken as the contact angle value.

(Scratch Resistance Test)

BON STAR steel wool (#0000) (product name: BON STAR, available from Bonstar Sales Co., Ltd.) was rubbed to and fro on the surface of the low refractive index layer of the optical layered body 10 times under a load of 700 g/cm². The surface of the low refractive index layer was then visually examined for the presence or absence of scratches, and evaluated according to the following criteria.
  Excellent: No scratch or discoloration was observed.
  Good: Slight discoloration was observed.
  Poor: Scratches and discoloration were observed.

(Measurement of 5° Regular Reflectance)

Black vinyl tape (Yamato Vinyl Tape No200-38-21, 38 mm wide) was attached to the side opposite to the measurement side of the layered optical layered body, namely, the side on which the low refractive index was formed. The 5° regular reflectance (%) of the surface of the optical layered body was measured using an ultra violet-visible spectrophotometer (UV-2450, available from Shimadzu Corporation) in a wavelength range of 380 to 780 nm.

(Reflectance: Luminous Reflectance Measurement)

The reflectance (%) was determined as luminous reflectance. The luminous reflectance was calculated by software (included with the device) that converted the data of the measured 5° regular reflectance (%) into brightness perceived by human eyes.

For each sample, the average of reflectances measured at five points was taken as the results of the reflectance (%) (luminous reflectance) measurement (Table 2).

TABLE 2

| | Solid silica fine particles (parts by mass) | Ra (nm) | Rz (nm) | Indentation hardness (Mpa) 300 nm penetration | Indentation hardness (Mpa) 30 nm penetration | Contact angle (°) | Scratch resistance | Reflectance (%) |
|---|---|---|---|---|---|---|---|---|
| Example 12 | 10 | 1.2 | 13.2 | 533 | 497 | 101 | Excellent | 1.29 |
| Example 13 | None | 0.7 | 9.5 | 527 | 491 | 100 | Excellent | 1.31 |
| Example 14 | 10 | 1.5 | 29.8 | 526 | 522 | 103 | Good | 1.31 |
| Example 15 | 10 | 1.3 | 23.5 | 493 | 472 | 101 | Good | 1.33 |
| Example 16 | 10 | 1.4 | 25.4 | 572 | 555 | 101 | Good | 1.32 |
| Comparative Example 3 | 10 | 2.2 | 40.5 | 522 | 485 | 101 | Poor | 1.30 |
| Comparative Example 4 | 60 | 2.3 | 31.5 | 551 | 567 | 103 | Poor | 1.33 |

The optical layered bodies according to the examples had a Ra of the projections and depressions of 1.5 nm or less and a Rz of the projections and depressions of 30 nm or less in any 5-μm square region of the surface of the low refractive index layer, and the hardness measured by the nanoindentation method at an indenter penetration of 300 nm was higher than the hardness measured by the nanoindentation method at an indenter penetration of 30 nm. These optical layered bodies had both excellent scratch resistance and excellent antireflective performance.

In particular, very high scratch resistance was obtained in Examples 1 and 2, in which the optical layered bodies had a Ra of 1.2 nm or less and a Rz of 25 nm or less in a microscopic field of view and had a difference of 30 MPa or more between the indentation hardness at an indenter penetration depth of 30 nm and the indentation hardness at an indenter penetration depth of 300 nm.

In contrast, the optical layered bodies according to the comparative examples had Ra and Rz of the projections and depressions out of specific ranges in any 5-μm square region of the surface of the low refractive index layer. None of these optical layered bodies achieved excellent scratch resistance.

All the optical layered bodies according to the examples of the second aspect of the present invention had a total light transmittance of 90% or more as measured in conformity with JIS K7361 using "HM-150" available from Murakami Color Research Laboratory Co., Ltd. The optical layered bodies also had a 20° gloss value within the range of 70 to 140 and a 60° gloss value within the range of 100 to 160 as measured in conformity with JIS Z 8741 using Precision Gloss Meter GM-26PRO (Murakami Color Research Laboratory Co., Ltd.). The 20° gloss value/60° gloss value×100 (%) was 65 to 85(%).

The samples for gloss measurement had a size of 5 cm×10 cm. The measurement was performed three times with the back surface of the sample being brought into close contact with a black board by an air suction method. The average of the three measurements was taken as the measured value.

INDUSTRIAL APPLICABILITY

The optical layered body of the present invention can be suitably used in liquid crystal displays (LCDs), cathode ray tube (CRT) display devices, plasma displays (PDPs), electroluminescence displays (organic or inorganic ELDs), micro LED displays, field emission displays (FEDs), touch panels, and electric paper, and tablet PCs. The optical layered body can also be suitably used on the image display surface of foldable, bendable, or rollable image display devices and touch panels.

The invention claimed is:

1. An optical layered body comprising:
a light-transmitting substrate; and
an antiglare layer and a low refractive index layer disposed in the stated order on one surface of the light-transmitting substrate,
wherein the low refractive index layer has an arithmetic average roughness Ra of projections and depressions of 0.7 nm to 1.5 nm and a ten-point average roughness Rz of the projections and depressions of 9.5 nm to 35 nm, where the Ra and the Rz are measured in any 5-μm square region of a surface of the low refractive index layer, and
wherein the surface of the low refractive index layer has a hardness of 440 MPa or more and 1600 MPa or less as measured by a nanoindentation method at a penetration depth of 30 nm.

2. The optical layered body according to claim 1, wherein the surface of the low refractive index layer has a water contact angle of 102° or less.

3. The optical layered body according to claim 1, wherein the low refractive index layer contains hollow silica fine particles.

4. A polarizing plate comprising:
a polarizing element; and
the optical layered body according to claim 1, on a surface of the polarizing element.

5. A display panel comprising
the optical layered body according to claim 1, or a polarizing plate comprising:
a polarizing element; and
the optical layered body according to claim 1 on a surface of the polarizing element.

6. An image display device comprising
the optical layered body according to claim 1, or a polarizing plate comprising:
a polarizing element; and
the optical layered body according to claim 1 on a surface of the polarizing element.

7. An optical layered body comprising:
a light-transmitting substrate; and
an antiglare layer and a low refractive index layer disposed in the stated order on one surface of the light-transmitting substrate,
wherein the low refractive index layer has an arithmetic average roughness Ra of projections and depressions of 0.7 nm to 1.5 nm and a ten-point average roughness Rz of the projections and depressions of 9.5 nm to 30 nm, where the Ra and the Rz are measured in any 5-μm square region of a surface of the low refractive index layer,
wherein a hardness of the surface of the low refractive index layer measured by a nanoindentation method at an indenter penetration of 300 nm is higher than a hardness measured by the nanoindentation method at an indenter penetration of 30 nm, and wherein the lower limit of the hardness measured by the nanoindentation method at an indenter penetration of 300 nm is 490 MPa and the upper limit thereof is 580 MPa, and the lower limit of the hardness measured by the nanoindentation method at an indenter penetration of 30 nm is 470 MPa and the upper limit thereof is 560 MPa.

* * * * *